United States Patent
Takakubo et al.

(10) Patent No.: US 10,976,522 B2
(45) Date of Patent: Apr. 13, 2021

(54) IMAGING OPTICAL SYSTEM

(71) Applicant: HOYA CORPORATION, Tokyo (JP)

(72) Inventors: Yutaka Takakubo, Saitama (JP); Eijiroh Tada, Saitama (JP)

(73) Assignee: HOYA CORPORATION, Tokyo (JP)

( * ) Notice: Subject to any disclaimer, the term of this patent is extended or adjusted under 35 U.S.C. 154(b) by 597 days.

(21) Appl. No.: 15/722,181

(22) Filed: Oct. 2, 2017

(65) Prior Publication Data
US 2018/0149838 A1   May 31, 2018

(30) Foreign Application Priority Data
Nov. 30, 2016   (JP) .............................. JP2016-232067

(51) Int. Cl.
*G02B 13/00* (2006.01)
*G02B 15/14* (2006.01)
*G02B 13/18* (2006.01)

(52) U.S. Cl.
CPC ......... *G02B 13/0045* (2013.01); *G02B 13/18* (2013.01); *G02B 15/142* (2019.08)

(58) Field of Classification Search
CPC .. G02B 13/0045; G02B 15/142; G02B 13/18; G02B 15/1425; G02B 9/04; G02B 9/08; G02B 9/10; G02B 9/00–64; G02B 13/002–0045; G02B 3/04
USPC ................................. 359/691, 753, 708–718
See application file for complete search history.

(56) References Cited

U.S. PATENT DOCUMENTS

| | | | |
|---|---|---|---|
| 8,780,464 B2 | 7/2014 | Huang | |
| 9,429,767 B2 | 8/2016 | Takakubo | |
| 9,664,881 B2 | 5/2017 | Koreeda | |
| 2004/0257677 A1 | 12/2004 | Matsusaka | |
| 2012/0212839 A1* | 8/2012 | Hsu | G02B 13/0035 359/716 |
| 2012/0268835 A1* | 10/2012 | Huang | G02B 13/0045 359/717 |
| 2013/0329121 A1* | 12/2013 | Ono | G02B 15/142 359/691 |

(Continued)

FOREIGN PATENT DOCUMENTS

| | | |
|---|---|---|
| JP | 2004-354572 | 12/2004 |
| JP | 2005-010521 | 1/2005 |

OTHER PUBLICATIONS

U.S. Appl. No. 15/450,456 to Akitoshi Usui et al., which was filed on Mar. 6, 2017.

*Primary Examiner* — Marin Pichler
*Assistant Examiner* — Alberto J Betancourt
(74) *Attorney, Agent, or Firm* — Greenblum & Bernstein, P.L.C.

(57) ABSTRACT

An imaging optical system includes a positive or negative first lens group, a diaphragm and a positive second lens group. The first lens group includes a positive lens element, provided closest to the object side, that has an aspherical surface on the object side thereof, the aspherical surface including a paraxial convex surface convexing toward the object side. This aspherical surface has a curvature that is positive along a meridional cross-section at the paraxial portion thereof, and the curvature of the meridional cross-section changes from a positive value to a negative value in an area within 75% of an effective aperture from the paraxial portion toward the periphery of the aspherical surface.

12 Claims, 9 Drawing Sheets

(56) References Cited

U.S. PATENT DOCUMENTS

2015/0153549 A1\* 6/2015 Muratani ............ G02B 15/142
359/691
2016/0161718 A1 6/2016 Koreeda
2016/0231535 A1\* 8/2016 Tang .................. G02B 13/0045

\* cited by examiner

FNO.=1:2.80
SPHERICAL ABERRATION CHROMATIC ABERRATION

Y=2.784
—— d Line
------ g Line
— — C Line
LATERAL CHROMATIC ABERRATION

Y=2.784
—— S
--- M
ASTIGMATISM

Y=2.784
DISTORTION

FNO.=1:2.80

SPHERICAL ABERRATION CHROMATIC ABERRATION d Line
g Line
C Line

Y=2.784

LATERAL CHROMATIC ABERRATION

Y=2.784

ASTIGMATISM

S
M

Y=2.784

DISTORTION

FNO.=1:2.80

SPHERICAL
ABERRATION
CHROMATIC
ABERRATION

Y=2.784

LATERAL
CHROMATIC
ABERRATION

Y=2.784

ASTIGMATISM

Y=2.784

DISTORTION

FNO.=1:2.80

— d Line
--- g Line
— - — C Line

-0.05  0.05
SPHERICAL
ABERRATION
CHROMATIC
ABERRATION

Y=2.784

-0.01  0.01
LATERAL
CHROMATIC
ABERRATION

Y=2.784

— S
--- M

-0.05  0.05
ASTIGMATISM

Y=2.784

-50.0  50.0%
DISTORTION

FNO.=1:2.80

— d Line
--- g Line
-- - C Line

-0.05  0.05
SPHERICAL
ABERRATION
CHROMATIC
ABERRATION

Y=2.784

-0.01  0.01
LATERAL
CHROMATIC
ABERRATION

Y=2.784

— S
--- M

-0.05  0.05
ASTIGMATISM

Y=2.784

-50.0  50.0%
DISTORTION

FNO.=1:2.80

— d Line
--- g Line
-·- C Line

-0.05  0.05
SPHERICAL
ABERRATION
CHROMATIC
ABERRATION

Y=2.784

-0.01  0.01
LATERAL
CHROMATIC
ABERRATION

Y=2.784

— S
--- M

-0.05  0.05
ASTIGMATISM

Y=2.784

-50.0  50.0%
DISTORTION

Fig. 13
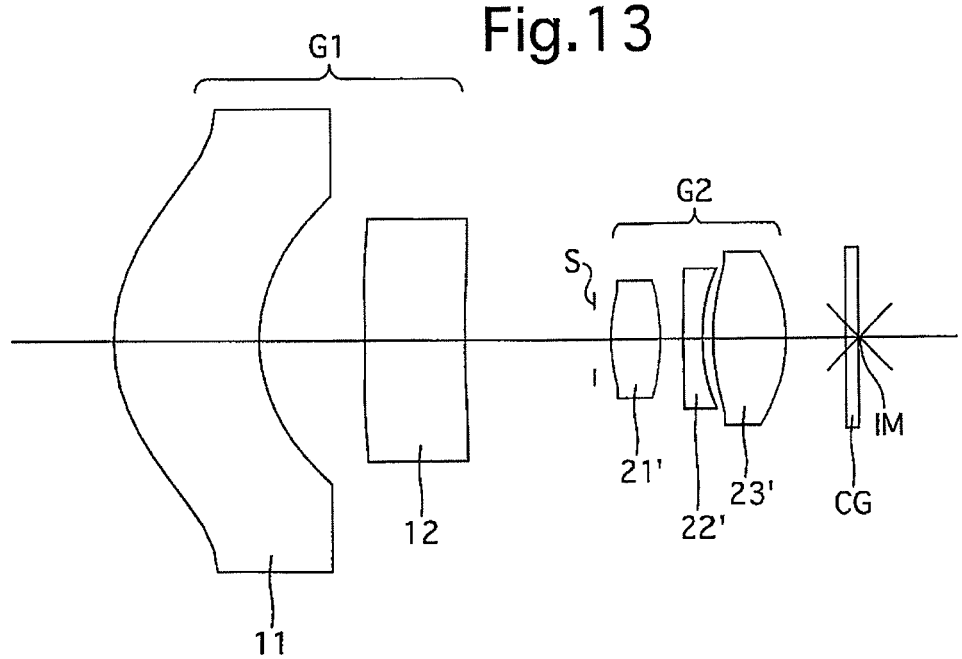
Fig. 14A
FNO.=1:2.80
— d Line
------ g Line
--- C Line
-0.05  0.05
SPHERICAL
ABERRATION
CHROMATIC
ABERRATION
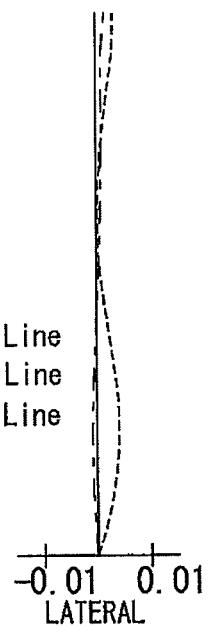
Fig. 14B
Y=2.784
-0.01  0.01
LATERAL
CHROMATIC
ABERRATION
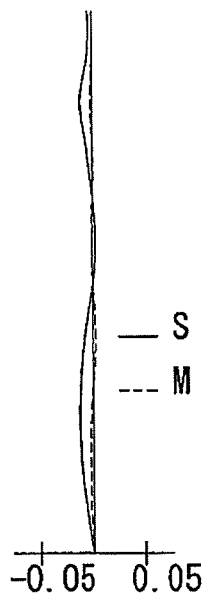
Fig. 14C
Y=2.784
— S
--- M
-0.05  0.05
ASTIGMATISM
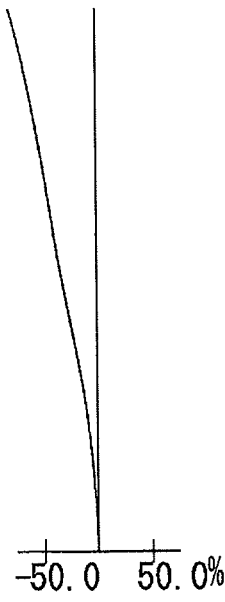
Fig. 14D
Y=2.784
-50.0  50.0%
DISTORTION

FNO.=1:2.80

SPHERICAL
ABERRATION
CHROMATIC
ABERRATION

— d Line
--- g Line
— — C Line

Y=2.784

LATERAL
CHROMATIC
ABERRATION

Y=2.784

ASTIGMATISM

— S
--- M

Y=2.784

DISTORTION

FNO.=1:2.80

—— d Line
------ g Line
--- C Line

-0.05  0.05
SPHERICAL
ABERRATION
CHROMATIC
ABERRATION

Y=2.784

-0.01  0.01
LATERAL
CHROMATIC
ABERRATION

Y=2.784

—— S
--- M

-0.05  0.05
ASTIGMATISM

Y=2.784

-50.0  50.0%
DISTORTION

IMAGING OPTICAL SYSTEM

BACKGROUND OF THE INVENTION

1. Field of the Invention

The present invention relates to an imaging optical system which can be provided in an imaging apparatus such as, e.g., an in-vehicle camera, a surveillance camera, and a portable terminal (including a mobile phone, a smart phone or other smart devices).

2. Description of Related Art

Patent Literature 1 discloses an imaging optical system provided with an image sensor, which converts an optical image into electrical signals, and an imaging lens group which forms an optical image onto a light-receiving surface of the image sensor. The imaging lens group is provided with an aspherical surface, on the lens surface closest to the object side, having a positive optical power at the central area of the lens surface and a negative optical power at a peripheral area of the lens surface, whereby this aspherical surface produces negative distortion.

Patent Literature 1: Japanese Unexamined Patent Publication No. 2005-010521.

However, in the imaging optical system of Patent Literature 1, there is a problem with not being able to sufficiently achieve both a wide angle-of-view and image magnification at the central area of the picture frame. In the embodiments disclosed in Patent Literature 1, when a value is calculated by dividing the focal length of the entire optical system by the maximum image height, this value is the largest in the second embodiment at approximately 2.7, and is the smallest in the first embodiment at approximately 2.2. Since the value of the focal length of the entire optical system divided by the maximum image height corresponds to a focal length for the case where the image size is constant, the larger this value is, the larger the image that can be attained at the central area of the picture frame. Out of the embodiments disclosed in Patent Literature 1, the second embodiment specifies the largest of such a value (the value of the focal length of the entire optical system divided by the maximum image height) and can attain an enlarged image at the central area of the picture frame, however, the angle-of-view is only 66 degrees, so that an image having a wide angle-of-view cannot be achieved. Whereas, in the first embodiment of Patent Literature 1 in which the angle-of-view is 110 degrees, which is a wide angle-of-view, the value of the focal length of the entire optical system divided by the maximum image height is only approximately 2.2, so that the magnification of the image at the central area of the picture frame is insufficient.

SUMMARY OF THE INVENTION

The present invention has been devised in view of the above-described problems, and provides an imaging optical system which can achieve a wide angle-of-view while enlarging the object image at the central area of the picture screen.

According to an aspect of the present invention, an imaging optical system is provided, including a positive or negative first lens group, an aperture diaphragm, and a positive second lens group, in that order from the object side. The first lens group includes a positive lens element provided closest to the object side. The positive lens element that is provided closest to the object side within the first lens group includes an aspherical surface on the object side thereof, the aspherical surface including a paraxial convex surface convexing toward the object side. The aspherical surface on the object side of the positive lens element that is provided closest to the object side within the first lens group has a curvature that is positive along a meridional cross-section at the paraxial portion thereof, and the curvature of the meridional cross-section changes from a positive value to a negative value in an area within 75% of an effective aperture from the paraxial portion toward the periphery of the aspherical surface.

It is desirable for the aspherical surface on the object side of the positive lens element that is provided closest to the object side within the first lens group to have a curvature that is positive along a meridional cross-section at the paraxial portion thereof, and the curvature of the meridional cross-section to change from a positive value to a negative value in an area within 50% to 75% of an effective aperture from the paraxial portion toward the periphery of the aspherical surface.

In the present specification, in addition to the case where an aperture diaphragm is positioned between a surface closest to the image side on the first lens group and a surface closest to the object side on the second lens group, "a first lens group, an aperture diaphragm and a second lens group, in that order from the object side (in other words, an aperture diaphragm is provided between the first lens group and the second lens group)" also refers to the case where the aperture diaphragm is positioned on a plane that is orthogonal to the optical axis and is tangent to surface closest to the image side on the first lens group, or at a position that is slightly toward the object side from such a plane so that the aperture diaphragm and the first lens group overlap with respect to the optical axis direction; and also refers to the case where the aperture diaphragm is positioned on a plane that is orthogonal to the optical axis and is tangent to surface closest to the object side on the second lens group, or at a position that is slightly toward the image side from such a plane so that the aperture diaphragm and the second lens group overlap with respect to the optical axis direction.

In the present specification, "effective aperture of a lens element" refers to the maximum area of a light-ray passage of the lens element determined by light rays that pass through the lens element at a maximum position (distance) from the optical axis out of the light rays from the center (on the optical axis) of an image, formed by an optical system that includes the lens element, to the maximum image height.

It is desirable for the following conditions (1), (2), (3) and (4) to be satisfied:

$$R1/f < 1.4 \quad (1),$$

$$D1/f > 0.2 \quad (2),$$

$$f1/f < 20 \quad (3), \text{ and}$$

$$V > 56 \quad (4),$$

wherein f designates the focal length of the entire imaging optical system, f1 designates the focal length of the positive lens element that is provided closest to the object side within the first lens group, R1 designates the paraxial radius of curvature of the surface on the object side of the positive lens element provided closest to the object side within the first lens group, D1 designates the thickness along the optical axis of the positive lens element provided closest to the object side within the first lens group, and V designates the Abbe number with respect to the d-line of the lens element that is provided closest to the aperture diaphragm within the second lens group.

It is desirable for the following condition (5) to be satisfied:

$$-2<f1/fg1<1 \qquad (5),$$

wherein f1 designates the focal length of the positive lens element that is provided closest to the object side within the first lens group, and fg1 designates the focal length of the first lens group.

It is desirable for the following condition (6) is satisfied:

$$-0.20<(R1-R2)/(R1+R2)<0.55 \qquad (6),$$

wherein R1 designates the paraxial radius of curvature of the surface on the object side of the positive lens element that is provided closest to the object side within the first lens group, and R2 designates the paraxial radius of curvature of the surface on the image side of the positive lens element that is provided closest to the object side within the first lens group.

The first lens group can include a negative lens element provided immediately behind the positive lens element that is provided closest to the object side.

The negative lens element, which is provided immediately behind the positive lens element that is provided closest to the object side, can include a concave surface on the image side at the paraxial portion thereof.

A difference in Abbe number with respect to the d-line between the positive lens element that is provided closest to the object side and the negative lens element, provided immediately behind the positive lens element that is provided closest to the object side, can be 10 or greater.

The second lens group can include at least one positive lens element that has an Abbe number with respect to the d-line of 70 or greater.

The second lens group can include at least one negative lens element that has an Abbe number with respect to the d-line of 30 or less.

It is desirable for a value of the focal length of the entire optical system divided by the maximum image height to be greater than or equal to 2.9.

In an embodiment, an imaging optical system is provided, including a positive or negative first lens group, an aperture diaphragm, and a positive second lens group, in that order from the object side. The first lens group includes a lens element provided closest to the object side. The lens element that is provided closest to the object side within the first lens group includes an aspherical surface on the object side thereof, the aspherical surface including a paraxial convex surface convexing toward the object side. The aspherical surface on the object side of the lens element that is provided closest to the object side within the first lens group has a curvature that is positive along a meridional cross-section at the paraxial portion thereof, and the curvature of the meridional cross-section changes from a positive value to a negative value in an area within 75% of an effective aperture from the paraxial portion toward the periphery of the aspherical surface. A value of the focal length of the entire optical system divided by the maximum image height is greater than or equal to 2.9.

In an embodiment, an imaging optical system is provided, including a positive or negative first lens group, an aperture diaphragm, and a positive second lens group, in that order from the object side. The first lens group includes a lens element provided closest to the object side. The lens element that is provided closest to the object side within the first lens group includes an aspherical surface on the object side thereof, the aspherical surface including a paraxial convex surface convexing toward the object side. A value of the focal length of the entire optical system divided by the maximum image height is greater than or equal to 2.9.

According to the present invention, an imaging optical system is obtained, which can achieve a wide angle-of-view while enlarging the object image at the central area of the picture screen.

The present disclosure relates to subject matter contained in Japanese Patent Application No. 2016-232067 (filed on Nov. 30, 2016) which is expressly incorporated herein in its entirety.

BRIEF DESCRIPTION OF THE DRAWINGS

The present invention will be discussed below in detail with reference to the accompanying drawings, in which:

FIG. 13 shows a lens arrangement of a seventh numerical embodiment of an imaging optical system, according to the present invention;

FIGS. 14A, 14B, 14C and 14D show various aberrations that occurred in the lens arrangement of FIG. 13;

DESCRIPTION OF THE EMBODIMENTS

Figure 1:
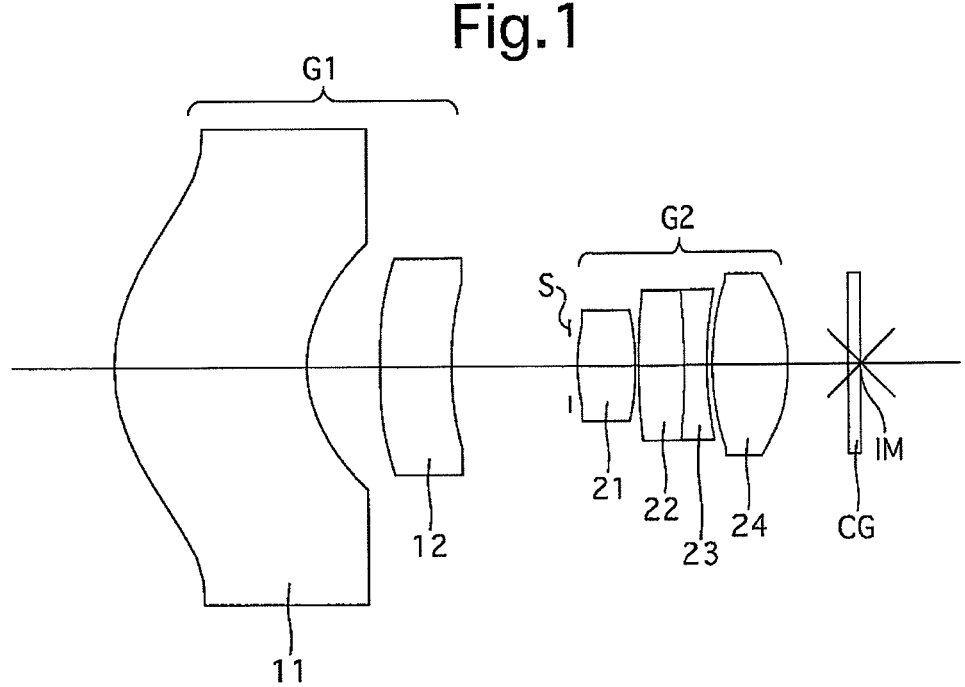
FIG. 1 shows a lens arrangement of a first numerical embodiment of an imaging optical system, according to the present invention.

The imaging optical system of the present invention is configured of a positive or negative first lens group G1, an aperture diaphragm S, and a positive second lens group G2, in that order from the object side. In each of the fourth through sixth numerical embodiments, the first lens group G1 has a positive refractive power. In each of the first through third and seventh through ninth numerical embodiments, the first lens group G1 has a negative refractive power. In each of the first through ninth numerical embodiments, a cover glass CG is provided between the second lens group G2 and an imaging surface IM (at a position immediately in front of the imaging surface IM).

In the first through ninth numerical embodiments, the first lens group G1 is configured of a positive lens element 11 formed from an aspherical glass molded lens element (having an aspherical surface on each side thereof), and a negative lens element 12 formed from an aspherical glass molded lens element (having an aspherical surface on each side thereof), in that order from the object side. The aspherical surface on the object side of the positive lens element 11 includes a paraxial convex surface, and the aspherical surface on the image side of the positive lens element 11 includes a paraxial concave surface. The aspherical surface on the object side of the positive lens element 11 has a curvature that is positive along the meridional cross-section at the paraxial portion thereof, and the curvature of the meridional cross-section changes from a positive value to a negative value in an area within 75% of the effective aperture from the paraxial portion toward the periphery. More specifically, the aspherical surface on the object side of the positive lens element 11 has a curvature that is positive along the meridional cross-section at the paraxial portion thereof, and the curvature of the meridional cross-section changes from a positive value to a negative value in an area within 50% (preferably 60%) to 75% of the effective aperture from the paraxial portion toward the periphery. The surface on the image side of the negative lens element 12 is a concave surface at the paraxial portion thereof (the negative lens element 12 has a meniscus profile having a concave surface on the image side or a biconcave profile).

In each of the first through sixth numerical embodiments, the second lens group G2 is configured of a positive lens element 21 formed from an aspherical glass molded lens element (having an aspherical surface on each side thereof), a positive lens element 22 formed from a spherical glass lens element, a negative lens element 23 formed from a spherical glass lens element, and a positive lens element 24 formed from an aspherical glass molded lens element (having an aspherical surface on each side thereof), in that order from the object side. The positive lens element 21 has a convex surface on the object side at the paraxial portion thereof (has a biconvex profile or a meniscus profile having a convex surface on the object side). The positive lens element 22 has a biconvex profile at the paraxial portion thereof. The negative lens element 23 has a concave surface on the object side at the paraxial portion (has a biconcave profile or a meniscus profile having a convex surface on the image side). The positive lens element 24 has a biconvex profile at the paraxial portion thereof. The positive lens element 22 and the negative lens element 23 are cemented to each other.

In each of the seventh through ninth numerical embodiments, the second lens group G2 is configured of a positive lens element 21' formed form an aspherical glass molded lens element (having an aspherical surface on each side thereof), a negative lens element 22' formed from a spherical glass lens element, and a positive lens element 23' formed from an aspherical glass molded lens element (having an aspherical surface on each side thereof), in that order from the object side. The positive lens element 21' has a biconvex profile at the paraxial portion thereof. The negative lens element 22' has a meniscus profile having a convex surface on the object side at the paraxial portion thereof. The positive lens element 23' has a biconvex profile at the paraxial portion thereof.

In the imaging optical system of the illustrated embodiments, in order to achieve a wide angle-of-view while enlarging the object image at the central area of the picture screen, the focal length that determines the size of the image at the vicinity of the central area is lengthened and light rays are collected into the optical system at a wider angle-of-view. More specifically, the surface on the object side of the positive lens element 11 that is provided closest to the object side within the first lens group G1 is formed as a convex surface at the paraxial portion thereof, and the curvature of the meridional cross-section changes from a positive value to a negative value in an area within the effective aperture. In particular, by forming the aspherical surface on the object side of the positive lens element 11 to change the curvature of the meridional cross-section from a positive curvature to a negative curvature in an area within 75% or less of the effective aperture, it is possible to achieve a wide angle-of-view while enlarging the object image at the central area of the picture screen. In addition to this condition, by forming the aspherical surface on the object side of the positive lens element 11 so that the area in which the above-mentioned change in curvature of the meridional cross-section from a positive curvature to a negative curvature occurs is also an area that is greater or equal to 50% (preferably 60%) of the effective aperture, the manufacturing of the positive lens element 11, and hence the entire optical system, can be facilitated while preventing the image around the peripheral area of the picture frame from becoming too small.

If there is a radial position on the aspherical surface on the object side of the positive lens element 11 at which the curvature changes from a positive value to a negative value, but occurs at a radial position in a peripheral area that is greater than 75% of the effective aperture, a wide angle-of-view and an enlarged object image at the central area of the picture screen cannot be both sufficiently achieved. On the other hand, if there is a radial position on the aspherical surface on the object side of the positive lens element 11 at which the curvature changes from a positive value to a negative value, but occurs at a radial position in an area toward the paraxial side that is less than 50% of the effective aperture, the manufacturing of the positive lens element 11, and hence the entire optical system, becomes difficult while the image around the peripheral area of the picture frame becomes too small.

For example, in the above-mentioned Patent Literature 1, the maximum value of the focal length of the entire optical system divided by the maximum image height is 2.7 (second embodiment) and has an angle-of-view of 66 degrees. Whereas the illustrated embodiments of the imaging optical system according to the present invention can achieve a value of the focal length of the entire optical system divided by the maximum image height of 2.9 through 4.2, and can achieve an enlarged object image at the central area of the picture frame. However, the value of the focal length of the entire optical system divided by the maximum image height only needs to be equal to or greater than 2.9 (can be greater than 4.2) in order to achieve an enlarged object image at the central area of the picture frame. Furthermore, the angle-of-view is 95 degrees, and hence, a wider angle-of-view is also achieved.

In each illustrated embodiment of the imaging optical system, by providing the positive lens element 11 at a position closest to the object side within the first lens group G1, the light bundles that form various image heights mutually pass at positions that are relatively distant at a successive lens element (negative lens element 12), and accordingly, it is easy to exert different refractive power functions on the light bundles at various image heights, which is advantageous for achieving a wider angle-of-view and for aberration correction.

Condition (1) specifies the ratio of the focal length of the entire optical system (imaging optical system) to the paraxial radius of curvature of the surface on the object side of the positive lens element 11 that is provided closest to the object side within the first lens group G1. By satisfying condition (1), since the principal point position is distant from the imaging surface IM (since the lateral magnification of the optical system subsequent to the surface on the object side of the positive lens element 11 increases), the paraxial focal length of the entire optical system increases, and an enlarged object image at the central portion of the picture frame can be achieved.

If the upper limit of condition (1) is exceeded, it becomes difficult to achieve an enlarged object image at the central portion of the picture frame.

Condition (2) specifies the ratio of the focal length of the entire optical system (imaging optical system) to the thickness along the optical axis of the positive lens element 11 that is provided closest to the object side within the first lens group G1. By satisfying condition (2), since the principal point position is distant from the imaging surface IM (since the lateral magnification of the optical system subsequent to the surface on the object side of the positive lens element 11 increases), the paraxial focal length of the entire optical system increases, and an enlarged object image at the central portion of the picture frame can be achieved. If the lower limit of condition (2) is exceeded, it becomes difficult to achieve an enlarged object image at the central portion of the picture frame.

Condition (3) specifies the ratio of the focal length of the entire lens system (imaging optical system) to the focal length of the positive lens element 11 that is provided closest to the object side within the first lens group G1. By satisfying condition (3), the overall length of the optical system can be shortened.

If the upper limit of condition (3) is exceeded, the focal length of the positive lens element 11 becomes too long, so that the lateral magnification of the optical system thereafter (the remaining lens elements within the first lens group G1 and the second lens group G2) must be decreased, thereby increasing the overall length of the entire lens system (imaging optical system).

Condition (4) specifies the Abbe number with respect to the d-line of the lens element (21 or 21') that is provided closest to the aperture diaphragm S within the second lens group G2. By satisfying condition (4), since occurrence of axial chromatic aberration can be suppressed even if the refractive power of the lens element that bears the main burden of the positive refractive power is increased, an imaging optical system can be achieved in which the overall length of the entire lens system (imaging optical system) is reduced while favorably correcting aberrations.

If the lower limit of condition (4) is exceeded, occurrence of axial chromatic aberration increases, so that it becomes difficult to achieve an imaging optical system in which various aberrations are favorably corrected. Furthermore, it becomes difficult to reduce the overall length of the entire lens system (imaging optical system). Condition (5) specifies the ratio of the focal length of the positive lens element 11 provided closest to the object side within the first lens group G1 to the focal length of the first lens group G1. By satisfying condition (5), the object image at a central portion (of the picture frame) can be enlarged.

If either of the upper limit or the lower limit of condition (5) is exceeded, since the refractive power of the positive lens element 11 becomes small (weak), the focal length of the entire lens system (imaging optical system) is shortened and it becomes difficult to form an enlarged object image at a central portion of the picture frame.

Condition (6) specifies the shape (shaping factor) of the positive lens element 11 provided closest to the object side within the first lens group G1. By satisfying condition (6), the lens diameter of the positive lens element 11 can be reduced, the overall length of the lens system (imaging optical system) can be reduced, and various aberrations can be favorably corrected.

If the upper limit of condition (6) is exceeded, the lens diameter of the positive lens element 11 increases and the overall length of the lens system (imaging optical system) increases.

If the lower limit of condition (6) is exceeded, it becomes difficult to correct various aberrations.

In the imaging optical system of the illustrated embodiments, by providing the negative lens element 12 subsequently (immediately) behind the positive lens element 11, which is provided closest to the object side within the first lens group G1, a wider angle-of-view can be achieved via both the negative refractive power of the outer periphery of the positive lens element 11 and the negative refractive power of the negative lens element 12.

In the imaging optical system of the illustrated embodiments, by forming the negative lens element (12) provided within the first lens group G1 with a concave surface on the image side at the paraxial portion thereof, coma and aspherical aberration can be favorably corrected.

In the imaging optical system of the illustrated embodiments, by setting the difference in the Abbe numbers with respect to the d-line between that of the positive lens element 11 (provided closest to the object side within the first lens group G1) and that of the negative lens element 12 provided (immediately) therebehind to 10 or greater, lateral chromatic aberration can be favorably corrected.

In the imaging optical system of the illustrated embodiments, at least one positive lens element having an Abbe number with respect to the d-line that is 70 or greater is provided within the second lens group G2. Since the second lens group G2 possesses a strong positive refractive power, using a positive lens element that is formed from low-dispersion glass having a large Abbe number with respect to the d-line is advantageous for correction of axial chromatic aberration.

In the imaging optical system of the illustrated embodiments, at least one negative lens element having an Abbe number with respect to the d-line that is 30 or less is provided within the second lens group G2. By using a positive lens element having an Abbe number with respect to the d-line that is 70 or greater together with a negative lens element having an Abbe number with respect to the d-line that is 30 or less, axial chromatic aberration can be favorably corrected due to the synergistic effect of these two lens elements.

Numerical Embodiments

Specific numerical first through ninth embodiments will be herein discussed. In the aberration diagrams and the tables, the d-line, g-line and C-line show aberrations at their respective wave-lengths; S designates the sagittal image, M designates the meridional image, f designates the focal length of the entire optical system, FNO. designates the f-number, W designates the half angle of view (°), Y designates the image height (maximum image height), r designates the (paraxial) radius of curvature, d designates the lens thickness or distance between lenses, N(d) designates the refractive index at the d-line, and vd designates the Abbe number with respect to the d-line. The unit used for the various lengths is defined in millimeters (mm). The "Effective Aperture" in the lens data indicates a radius (a distance from the optical axis) that is determined by light rays that pass through the lens element at a maximum distant position from the optical axis out of the light rays from a central image height to a maximum image height of the optical system.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

Figure 2A:
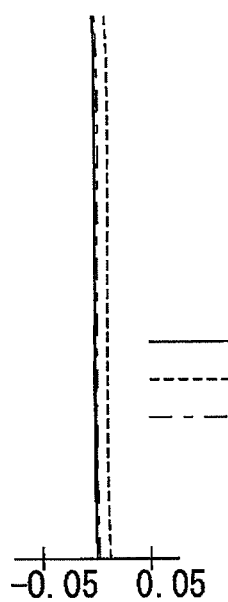
FIGS. 2A, 2B, 2C and 2D show various aberrations that occurred in the lens arrangement of FIG. 1.
Figure 2B:
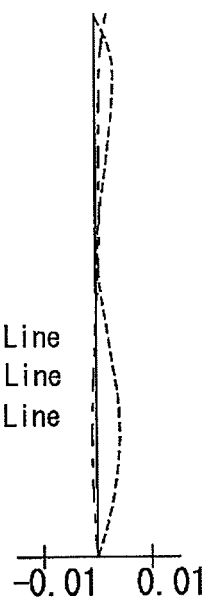
Figure 2C:
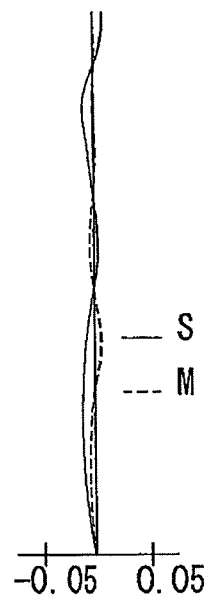
Figure 2D:
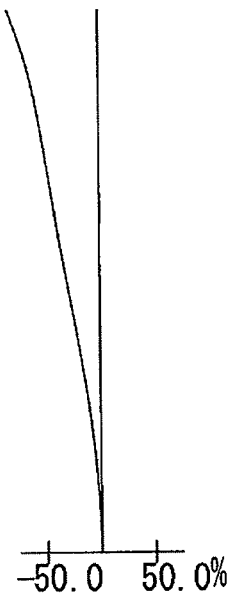

FIGS. 1 through 2D and Tables 1 through 5 show a first numerical embodiment of the imaging optical system, according to the present invention. FIG. 1 shows a lens arrangement of the imaging optical system. FIGS. 2A, 2B, 2C and 2D show various aberrations that occurred in the zoom lens system of FIG. 1. Table 1 indicates the surface data, Table 2 indicates various lens system data, Table 3 indicates focal length data, Table 4 indicates curvature data of the meridional cross-section of the aspherical surface on the object side of the positive lens element 11, which provided closest to the object side within the first lens group G1, and Table 5 indicates aspherical surface data.

The imaging optical system of the first numerical embodiment is configured of a negative first lens group G1, an aperture diaphragm S, and a positive second lens group G2, in that order from the object side. A cover glass CG is provided between the second lens group G2 and an imaging surface IM (immediately in front of the imaging surface IM).

The first lens group G1 is configured of a positive lens element 11 formed from an aspherical glass molded lens element (having an aspherical surface on each side thereof), and a negative lens element 12 formed from an aspherical glass molded lens element (having an aspherical surface on each side thereof), in that order from the object side. The aspherical surface on the object side of the positive lens element 11 includes a paraxial convex surface convexing toward the object side. The aspherical surface on the image side of the positive lens element 11 includes a paraxial concave surface concaving toward the object side. The aspherical surface on the object side of the positive lens element 11 has a curvature that is positive along the meridional cross-section at the paraxial portion thereof, and the curvature of the meridional cross-section changes from a positive value to a negative value in an area within 75% of the effective aperture from the paraxial portion toward the periphery. The negative lens element 12 has a meniscus profile having a concave surface on the image side.

The second lens group G2 is configured of a positive lens element 21 formed from an aspherical glass molded lens element (having an aspherical surface on each side thereof), a positive lens element 22 formed from a spherical glass lens element, a negative lens element 23 formed from a spherical glass lens element, and a positive lens element 24 formed from an aspherical glass molded lens element (having an aspherical surface on each side thereof), in that order from the object side. The positive lens element 21 has a biconvex profile at the paraxial portion thereof, the positive lens element 22 has a biconvex profile at the paraxial portion thereof, the negative lens element 23 has a biconcave profile at the paraxial portion thereof, and the positive lens element 24 has a biconvex profile at the paraxial portion thereof. The positive lens element 22 and the negative lens element 23 are cemented to each other.

TABLE 1

SURFACE DATA

| Surf. No. | r | d | N(d) | vd | Effective Aperture |
|---|---|---|---|---|---|
| 1* | 6.017 | 6.352 | 1.55332 | 71.7 | 7.29 |
| 2* | 4.095 | 2.443 | | | 4.02 |
| 3* | 42.909 | 2.404 | 1.82115 | 24.1 | 3.59 |
| 4* | 14.557 | 3.942 | | | 2.73 |
| 5(Diaphragm) | ∞ | 0.249 | | | 1.01 |
| 6* | 5.929 | 1.933 | 1.55332 | 71.7 | 1.29 |
| 7* | -7.857 | 0.100 | | | 1.76 |
| 8 | 21.132 | 1.617 | 1.55032 | 75.5 | 1.89 |
| 9 | -21.132 | 0.700 | 1.80809 | 22.8 | 2.16 |
| 10 | 11.655 | 0.198 | | | 2.35 |
| 11* | 8.911 | 2.561 | 1.55332 | 71.7 | 2.57 |
| 12* | -7.592 | 2.055 | | | 2.83 |
| 13 | ∞ | 0.400 | 1.51680 | 64.2 | 2.79 |
| 14 | ∞ | 0.045 | | | 2.78 |
| IM(Imaging Surface) | | | | | |

The asterisk (*) designates an aspherical surface which is rotationally symmetrical with respect to the optical axis.

TABLE 2

VARIOUS LENS SYSTEM DATA

| | |
|---|---|
| f [mm] | 9.00 |
| FNO. | 2.80 |
| W [°] | 47.5 |
| Y [mm] | 2.784 |
| Value [f/Y] of entire lens system focal length divided by the image height (maximum image height): | 3.23 |
| Height at which the curvature of the meridional cross-section of the aspherical surface on the object side of the positive lens element 11 changes from a positive value to a negativev alue: | 4.76 [mm] |
| The ratio of the height, relative to the lens effective aperture, at which the curvature of the meridional cross-section of the aspherical surface on the object side of the positive lens element 11 changes from a positive value to a negative value: | 0.65 [65%] |

TABLE 3

FOCAL LENGTH DATA

| | |
|---|---|
| Focal length of first lens group G1: | -74.256 |
| Focal length of second lens group G2: | 5.340 |
| Focal length of positive lens element 11: | 130.574 |
| Focal length of negative lens element 12: | -27.895 |

TABLE 3-continued

FOCAL LENGTH DATA

| | |
|---|---|
| Focal length of positive lens element 21: | 6.428 |
| Focal length of positive lens element 22: | 19.464 |
| Focal length of negative lens element 23: | −9.208 |
| Focal length of positive lens element 24: | 7.842 |

TABLE 4

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 7.290 | 1.000 | −0.289 |
| 6.926 | 0.950 | −0.335 |
| 6.561 | 0.900 | −0.282 |
| 6.197 | 0.850 | −0.196 |
| 5.832 | 0.800 | −0.122 |
| 5.468 | 0.750 | −0.067 |
| 5.103 | 0.700 | −0.028 |
| 4.739 | 0.650 | 0.002 |
| 4.374 | 0.600 | 0.026 |
| 4.010 | 0.550 | 0.049 |
| 3.645 | 0.500 | 0.070 |
| 3.281 | 0.450 | 0.089 |
| 2.916 | 0.400 | 0.107 |
| 2.552 | 0.350 | 0.122 |
| 2.187 | 0.300 | 0.134 |
| 1.823 | 0.250 | 0.144 |
| 1.458 | 0.200 | 0.152 |
| 1.094 | 0.150 | 0.159 |
| 0.729 | 0.100 | 0.163 |
| 0.365 | 0.050 | 0.166 |
| 0.000 | 0.000 | 0.166 |

TABLE 5

ASPHERICAL SURFACE DATA

| Surf.No. | K | A3 | A4 | A6 |
|---|---|---|---|---|
| 1 | −1.000 | 1.93600E−04 | −6.81542E−05 | 5.13027E−06 |
| 2 | −1.000 | 6.09363E−04 | −9.79823E−04 | −6.34016E−05 |
| 3 | −1.000 | 0.00000E+00 | 3.83492E−03 | −2.14977E−04 |
| 4 | −1.000 | 0.00000E+00 | 4.39856E−03 | −3.47793E−04 |
| 6 | 0.000 | 0.00000E+00 | −8.45320E−04 | 1.24536E−04 |
| 7 | 0.000 | 0.00000E+00 | 2.79929E−03 | 3.58160E−04 |
| 11 | 0.000 | 0.00000E+00 | 1.23207E−03 | 3.48541E−04 |
| 12 | 0.000 | 0.00000E+00 | −1.44702E−02 | 3.25047E−03 |

| Surf.No. | A8 | A10 | A12 |
|---|---|---|---|
| 1 | −1.47800E−06 | 5.92027E−08 | −1.12380E−09 |
| 2 | −1.86492E−06 | 3.90749E−06 | −3.57191E−07 |
| 3 | 2.79634E−05 | −2.90421E−06 | 9.53234E−08 |
| 4 | −2.93019E−05 | 4.19167E−06 | −1.15390E−07 |
| 6 | −3.08837E−04 | 1.07146E−04 | 0.00000E+00 |
| 7 | −2.00831E−04 | 2.68127E−05 | 0.00000E+00 |
| 11 | −1.14214E−04 | 1.13310E−05 | −4.14528E−07 |
| 12 | −3.76196E−04 | 2.23555E−05 | −5.47296E−07 |

| Surf.No. | A14 | A16 | A18 |
|---|---|---|---|
| 1 | 8.53266E−12 | 1.23881E−14 | −3.38930E−16 |
| 2 | 9.14000E−09 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

Numerical Embodiment 2

Figure 3:
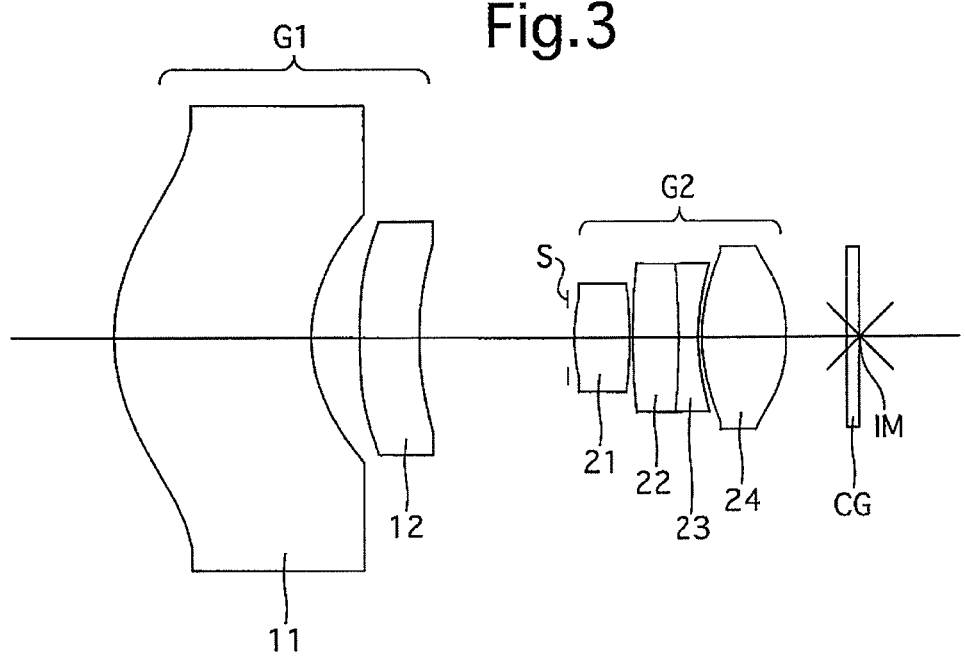
FIG. 3 shows a lens arrangement of a second numerical embodiment of an imaging optical system, according to the present invention.
Figure 4A:
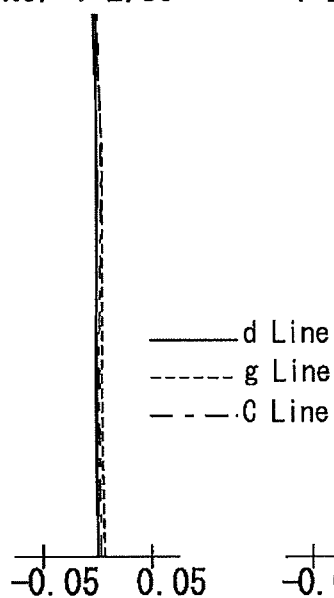
FIGS. 4A, 4B, 4C and 4D show various aberrations that occurred in the lens arrangement of FIG. 3.
Figure 4B:
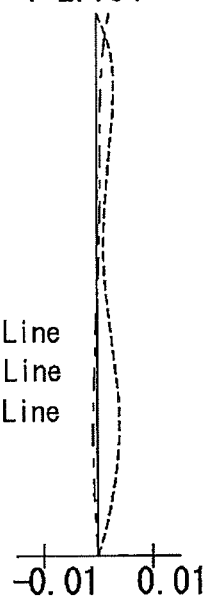
Figure 4C:
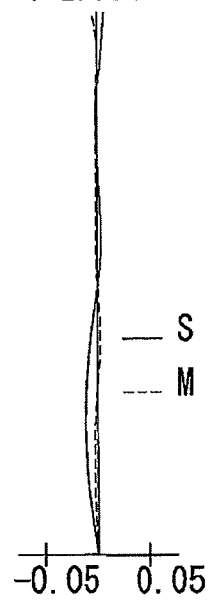
Figure 4D:
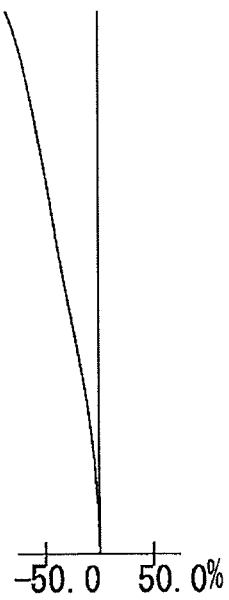

FIGS. 3 through 4D and Tables 6 through 10 show a second numerical embodiment of the imaging optical system, according to the present invention. FIG. 3 shows a lens arrangement of the imaging optical system. FIGS. 4A, 4B, 4C and 4D show various aberrations that occurred in the zoom lens system of FIG. 3. Table 6 indicates the surface data, Table 7 indicates various lens system data, Table 8 indicates focal length data, Table 9 indicates curvature data of the meridional cross-section of the aspherical surface on the object side of the positive lens element 11, which provided closest to the object side within the first lens group G1, and Table 10 indicates aspherical surface data.

The second numerical embodiment has the same lens arrangement as that of the first numerical embodiment.

TABLE 6

SURFACE DATA

| Surf. No. | r | d | N(d) | vd | Effective Aperture |
|---|---|---|---|---|---|
| 1* | 6.254 | 6.554 | 1.55332 | 71.7 | 7.25 |
| 2* | 4.576 | 1.620 | | | 4.08 |
| 3* | 30.772 | 1.995 | 1.82115 | 24.1 | 3.87 |
| 4* | 13.328 | 4.929 | | | 3.15 |
| 5(Diaphragm) | ∞ | 0.218 | | | 1.02 |
| 6* | 5.578 | 1.862 | 1.55332 | 71.7 | 1.28 |
| 7* | −12.347 | 0.100 | | | 1.73 |
| 8 | 24.394 | 1.578 | 1.55032 | 75.5 | 1.84 |
| 9 | −24.394 | 0.700 | 1.80518 | 25.5 | 2.13 |
| 10 | 9.091 | 0.100 | | | 2.34 |
| 11* | 6.143 | 2.843 | 1.55332 | 71.7 | 2.59 |
| 12* | −7.065 | 2.055 | | | 2.85 |
| 13 | ∞ | 0.400 | 1.51680 | 64.2 | 2.79 |
| 14 | ∞ | 0.045 | | | 2.79 |
| IM (Imaging Surface) | | | | | |

The asterisk (*) designates an aspherical surface which is rotationally symmetrical with respect to the optical axis.

TABLE 7

VARIOUS LENS SYSTEM DATA

| | |
|---|---|
| f[mm] | 9.50 |
| FNO. | 2.80 |
| W [°] | 47.5 |
| Y [mm] | 2.784 |
| Value [f/Y] of entire lens system focal length divided by the image height (maximum image height): | 3.41 |
| Height at which the curvature of the meridional cross-section of the aspherical surface on the object side of the positive lens element 11 changes from a positive value to a negative value: | 4.59 [mm] |
| The ratio of the height, relative to the lens effective aperture, at which the curvature of the meridional cross-section of the aspherical surface on the object side of the positive lens element 11 changes from a positive value to a negative value: | 0.63 [63%] |

TABLE 8

FOCAL LENGTH DATA

| | |
|---|---|
| Focal length of first lens group G1: | −153.209 |
| Focal length of second lens group G2: | 5.576 |
| Focal length of positive lens element 11: | 78.780 |
| Focal length of negative lens element 12: | −30.189 |

TABLE 8-continued

FOCAL LENGTH DATA

| | |
|---|---|
| Focal length of positive lens element 21: | 7.211 |
| Focal length of positive lens element 22: | 22.421 |
| Focal length of negative lens element 23: | −8.149 |
| Focal length of positive lens element 24: | 6.432 |

TABLE 9

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 7.250 | 1.000 | −0.277 |
| 6.888 | 0.950 | −0.338 |
| 6.525 | 0.900 | −0.307 |
| 6.163 | 0.850 | −0.227 |
| 5.800 | 0.800 | −0.149 |
| 5.438 | 0.750 | −0.087 |
| 5.075 | 0.700 | −0.043 |
| 4.713 | 0.650 | −0.009 |
| 4.350 | 0.600 | 0.018 |
| 3.988 | 0.550 | 0.041 |
| 3.625 | 0.500 | 0.063 |
| 3.263 | 0.450 | 0.083 |
| 2.900 | 0.400 | 0.100 |
| 2.538 | 0.350 | 0.116 |
| 2.175 | 0.300 | 0.128 |
| 1.813 | 0.250 | 0.138 |
| 1.450 | 0.200 | 0.146 |
| 1.088 | 0.150 | 0.152 |
| 0.725 | 0.100 | 0.157 |
| 0.363 | 0.050 | 0.159 |
| 0.000 | 0.000 | 0.160 |

TABLE 10

ASPHERICAL SURFACE DATA

| Surf.No. | K | A3 | A4 | A6 |
|---|---|---|---|---|
| 1 | −1.000 | 1.19311E−04 | −9.26126E−05 | 1.13300E−06 |
| 2 | −1.000 | 3.66659E−04 | −2.56200E−04 | −1.40492E−04 |
| 3 | −1.000 | 0.00000E+00 | 5.57175E−03 | −7.21704E−04 |
| 4 | −1.000 | 0.00000E+00 | 5.75730E−03 | −1.21750E−03 |
| 6 | 0.000 | 0.00000E+00 | −5.82839E−04 | −8.96300E−04 |
| 7 | 0.000 | 0.00000E+00 | 1.59966E−03 | 5.93050E−04 |
| 11 | 0.000 | 0.00000E+00 | −1.76491E−03 | 2.58565E−04 |
| 12 | 0.000 | 0.00000E+00 | −1.87823E−02 | 4.18767E−03 |

| Surf.No. | A8 | A10 | A12 |
|---|---|---|---|
| 1 | −1.26591E−06 | 5.48933E−08 | −1.11127E−09 |
| 2 | −1.46788E−06 | 3.37040E−06 | −2.86379E−07 |
| 3 | 7.07813E−05 | −3.96059E−06 | 8.81697E−08 |
| 4 | 1.28033E−04 | −7.58125E−06 | 1.92122E−07 |
| 6 | 7.20495E−04 | −2.60024E−04 | 0.00000E+00 |
| 7 | −7.91491E−05 | −2.12089E−05 | 0.00000E+00 |
| 11 | −2.52931E−05 | 3.68661E−06 | −2.82535E−07 |
| 12 | −6.00738E−04 | 5.23804E−05 | −1.87315E−06 |

| Surf.No. | A14 | A16 | A18 |
|---|---|---|---|
| 1 | 8.96002E−12 | 1.40249E−14 | −4.01686E−16 |
| 2 | 7.05873E−09 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

TABLE 10-continued

ASPHERICAL SURFACE DATA

| 11 | 0.00000E+00 | 0.00000E+00 | 0.00000E+00 |
|---|---|---|---|
| 12 | 0.00000E+00 | 0.00000E+00 | 0.00000E+00 |

Numerical Embodiment 3

Figure 5:
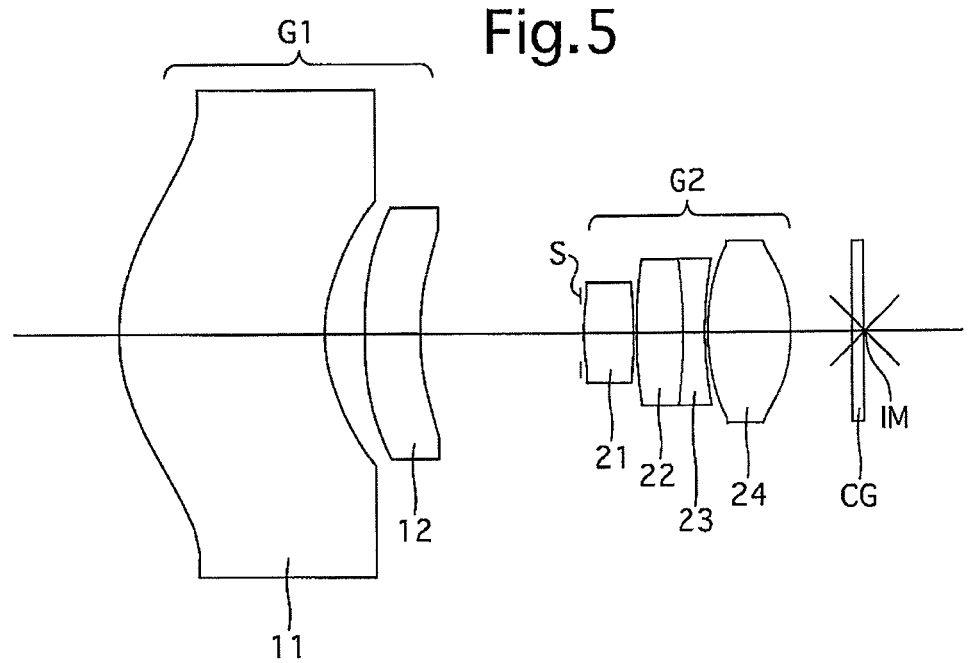
FIG. 5 shows a lens arrangement of a third numerical embodiment of an imaging optical system, according to the present invention.
Figure 6A:
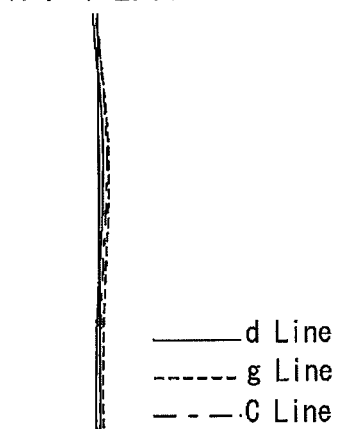
FIGS. 6A, 6B, 6C and 6D show various aberrations that occurred in the lens arrangement of FIG. 5.
Figure 6B:
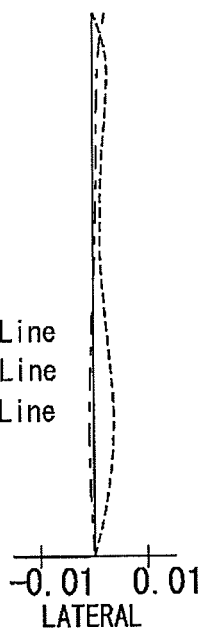
Figure 6C:
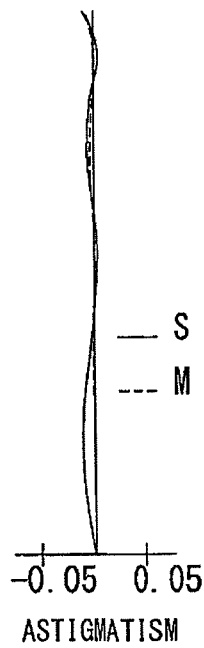
Figure 6D:
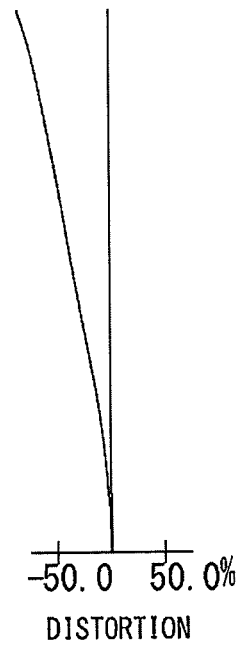

FIGS. 5 through 6D and Tables 11 through 15 show a third numerical embodiment of the imaging optical system, according to the present invention. FIG. 5 shows a lens arrangement of the imaging optical system. FIGS. 6A, 6B, 6C and 6D show various aberrations that occurred in the zoom lens system of FIG. 5. Table 11 indicates the surface data, Table 12 indicates various lens system data, Table 13 indicates focal length data, Table 14 indicates curvature data of the meridional cross-section of the aspherical surface on the object side of the positive lens element 11, which provided closest to the object side within the first lens group G1, and Table 15 indicates aspherical surface data.

The third numerical embodiment has the same lens arrangement as those of the first and second numerical embodiments.

TABLE 11

SURFACE DATA

| Surf. No. | r | d | N(d) | vd | Effective Aperture |
|---|---|---|---|---|---|
| 1* | 6.326 | 6.818 | 1.55332 | 71.7 | 7.58 |
| 2* | 5.057 | 1.340 | | | 4.38 |
| 3* | 35.538 | 1.892 | 1.82115 | 24.1 | 4.18 |
| 4* | 13.434 | 5.308 | | | 3.46 |
| 5(Diaphragm) | ∞ | 0.100 | | | 0.98 |
| 6* | 6.755 | 1.671 | 1.55332 | 71.7 | 1.12 |
| 7* | −17.896 | 0.100 | | | 1.61 |
| 8 | 16.058 | 1.651 | 1.55032 | 75.5 | 1.74 |
| 9 | −16.058 | 0.700 | 1.80518 | 25.5 | 2.08 |
| 10 | 12.439 | 0.100 | | | 2.31 |
| 11* | 5.984 | 2.819 | 1.55332 | 71.7 | 2.63 |
| 12* | −7.203 | 2.055 | | | 2.83 |
| 13 | ∞ | 0.400 | 1.51680 | 64.2 | 2.79 |
| 14 | ∞ | 0.045 | | | 2.79 |
| IM(Imaging Surface) | | | | | |

The asterisk (*) designates an aspherical surface which is rotationally symmetrical with respect to the optical axis.

TABLE 12

VARIOUS LENS SYSTEM DATA

| | |
|---|---|
| f[mm] | 10.00 |
| FNO. | 2.80 |
| W [°] | 47.5 |
| Y [mm] | 2.784 |
| Value [f/Y] of entire lens system focal length divided by the image height (maximum image height): | 3.59 |
| Height at which the curvature of the meridional cross-section of the aspherical surface on the object side of the positive lens element 11 changes from a positive value to a negative value: | 4.70 [mm] |
| The ratio of the height, relative to the lens effective aperture, at which the curvature of the meridional cross-section of the aspherical surface on the object side of the positive lens element 11 changes from a positive value to a negative value: | 0.62 [62%] |

TABLE 13

FOCAL LENGTH DATA

| | |
|---|---|
| Focal length of first lens group G1: | −5058.524 |
| Focal length of second lens group G2: | 5.546 |
| Focal length of positive lens element 11: | 49.844 |
| Focal length of negative lens element 12: | −27.360 |
| Focal length of positive lens element 21: | 9.082 |
| Focallength of positive lens element 22: | 14.861 |
| Focal length of negative lens element 23: | −8.611 |
| Focal length of positive lens element 24: | 6.394 |

TABLE 14

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 7.580 | 1.000 | −0.220 |
| 7.201 | 0.950 | −0.320 |
| 6.822 | 0.900 | −0.307 |
| 6.443 | 0.850 | −0.226 |
| 6.064 | 0.800 | −0.142 |
| 5.685 | 0.750 | −0.081 |
| 5.306 | 0.700 | −0.041 |
| 4.927 | 0.650 | −0.014 |
| 4.548 | 0.600 | 0.008 |
| 4.169 | 0.550 | 0.028 |
| 3.790 | 0.500 | 0.049 |
| 3.411 | 0.450 | 0.069 |
| 3.032 | 0.400 | 0.088 |
| 2.653 | 0.350 | 0.106 |
| 2.274 | 0.300 | 0.120 |
| 1.895 | 0.250 | 0.132 |
| 1.516 | 0.200 | 0.142 |
| 1.137 | 0.150 | 0.149 |
| 0.758 | 0.100 | 0.154 |
| 0.379 | 0.050 | 0.157 |
| 0.000 | 0.000 | 0.158 |

TABLE 15

ASPHERICAL SURFACE DATA

| Surf.No. | K | A3 | A4 | A6 |
|---|---|---|---|---|
| 1 | −1.000 | 1.67273E−05 | −1.12139E−04 | −2.90799E−06 |
| 2 | −1.000 | −2.14138E−04 | −4.11174E−04 | −1.77836E−04 |
| 3 | −1.000 | 0.00000E+00 | 8.45596E−03 | −1.12120E−03 |
| 4 | −1.000 | 0.00000E+00 | 1.00337E−02 | −1.98888E−03 |
| 6 | 0.000 | 0.00000E+00 | −8.63658E−04 | −2.99247E−03 |
| 7 | 0.000 | 0.00000E+00 | −1.19819E−03 | 1.53397E−03 |
| 11 | 0.000 | 0.00000E+00 | −2.59392E−03 | 2.04941E−04 |
| 12 | 0.000 | 0.00000E+00 | −1.96465E−02 | 4.66642E−03 |

| Surf.No. | A8 | A10 | A12 |
|---|---|---|---|
| 1 | −1.14466E−06 | 5.68812E−08 | −1.16049E−09 |
| 2 | 2.11607E−06 | 2.35028E−06 | −1.76838E−07 |
| 3 | 9.12419E−05 | −3.96894E−06 | 6.96144E−08 |
| 4 | 1.94848E−04 | −1.01111E−05 | 2.14734E−07 |
| 6 | 2.98799E−03 | −1.13599E−03 | 0.00000E+00 |
| 7 | −4.27365E−04 | 8.65066E−06 | 0.00000E+00 |
| 11 | 2.57233E−05 | −2.26232E−06 | −1.69364E−08 |
| 12 | −7.21058E−04 | 6.74908E−05 | −2.48486E−06 |

| Surf.No. | A14 | A16 | A18 |
|---|---|---|---|
| 1 | 8.97558E−12 | 1.17323E−14 | −3.38938E−16 |
| 2 | 3.78952E−09 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

TABLE 15-continued

ASPHERICAL SURFACE DATA (Note: continuation — additional rows under A8, A10, A12 columns)

| Surf.No. | A8 | A10 | A12 |
|---|---|---|---|
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

Numerical Embodiment 4

Figure 7:
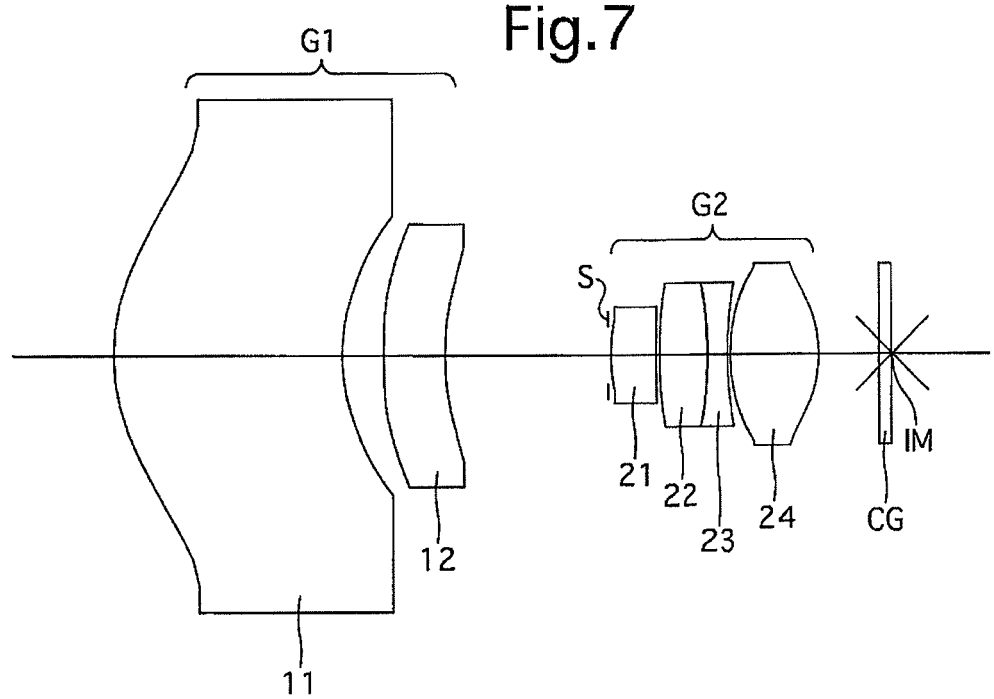
FIG. 7 shows a lens arrangement of a fourth numerical embodiment of an imaging optical system, according to the present invention.
Figure 8A:
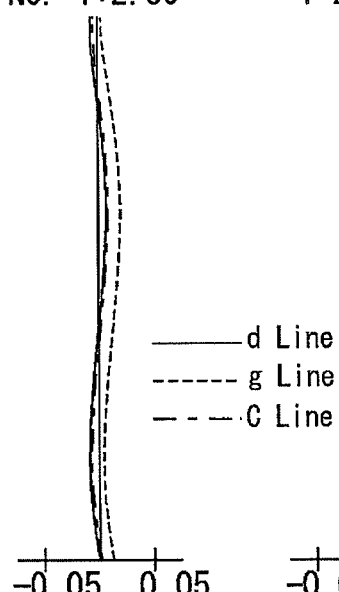
FIGS. 8A, 8B, 8C and 8D show various aberrations that occurred in the lens arrangement of FIG. 7.
Figure 8B:
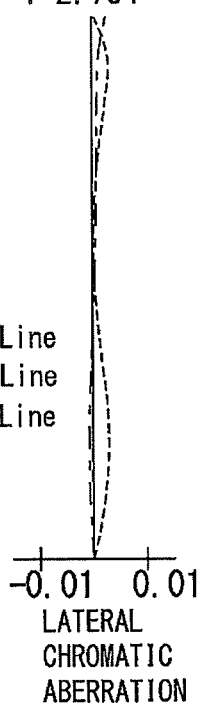
Figure 8C:
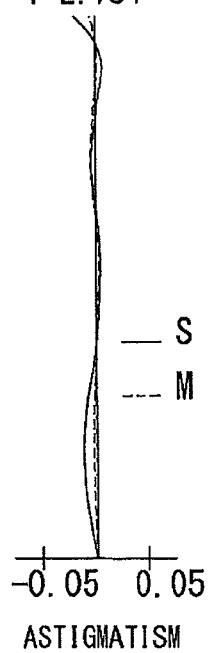
Figure 8D:
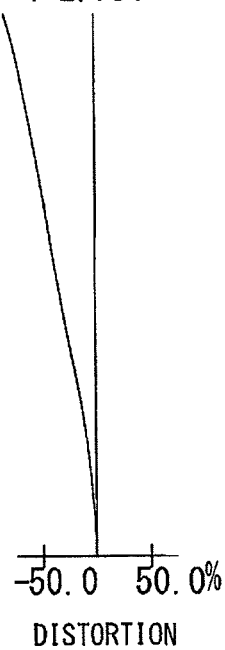

FIGS. 7 through 8D and Tables 16 through 20 show a fourth numerical embodiment of the imaging optical system, according to the present invention. FIG. 7 shows a lens arrangement of the imaging optical system. FIGS. 8A, 8B, 8C and 8D show various aberrations that occurred in the zoom lens system of FIG. 7. Table 16 indicates the surface data, Table 17 indicates various lens system data, Table 18 indicates focal length data, Table 19 indicates curvature data of the meridional cross-section of the aspherical surface on the object side of the positive lens element 11, which provided closest to the object side within the first lens group G1, and Table 20 indicates aspherical surface data.

The fourth numerical embodiment has the same lens arrangement as that of the first through third numerical embodiments except for the following features:

(1) The first lens group G1 has a positive refractive power instead of a negative refractive power.

(2) The positive lens element 21 of the second lens group G2 has a meniscus profile having a convex surface on the object side at the paraxial portion thereof.

TABLE 16

SURFACE DATA

| Surf. No. | r | d | N(d) | vd | Effective Aperture |
|---|---|---|---|---|---|
| 1* | 6.670 | 7.519 | 1.55332 | 71.7 | 8.04 |
| 2* | 5.650 | 1.402 | | | 4.59 |
| 3* | 50.839 | 2.076 | 1.82115 | 24.1 | 4.36 |
| 4* | 13.311 | 5.470 | | | 3.57 |
| 5(Diaphragm) | ∞ | 0.100 | | | 0.97 |
| 6* | 5.673 | 1.500 | 1.55332 | 71.7 | 1.12 |
| 7* | 481.627 | 0.100 | | | 1.55 |
| 8 | 14.979 | 1.645 | 1.55032 | 75.5 | 1.64 |
| 9 | −14.979 | 0.700 | 1.80518 | 25.5 | 2.01 |
| 10 | 13.019 | 0.100 | | | 2.26 |
| 11* | 5.813 | 2.954 | 1.55332 | 71.7 | 2.64 |
| 12* | −5.749 | 2.055 | | | 2.83 |
| 13 | ∞ | 0.400 | 1.51680 | 64.2 | 2.79 |
| 14 | ∞ | 0.045 | | | 2.78 |
| IM(Imaging Surface) | | | | | |

The asterisk (*) designates an aspherical surface which is rotationally symmetrical with respect to the optical axis.

TABLE 17

VARIOUS LENS SYSTEM DATA

| | |
|---|---|
| f[mm] | 10.50 |
| FNO. | 2.80 |
| W [°] | 47.5 |
| Y [mm] | 2.784 |
| Value [f/Y] of entire lens system focal length divided by the image height (maximum image height): | 3.77 |
| Height at which the curvature of the meridional cross-section of the aspherical surface on the object side of the positive lens element 11 changes from a positive value to a negative value: | 5.10 [mm] |

TABLE 17-continued

VARIOUS LENS SYSTEM DATA

| | |
|---|---|
| The ratio of the height, relative to the lens effective aperture, at which the curvature of the meridional cross-section of the aspherical surface on the object side of the positive lens element 11 changes from a positive value to a negative value: | 0.63 [63%] |

TABLE 18

FOCAL LENGTH DATA

| | |
|---|---|
| Focal length of first lens group G1: | 990.140 |
| Focal length of second lens group G2: | 5.493 |
| Focal length of positive lens element 11: | 41.064 |
| Focal length of negative lens element 12: | −22.522 |
| Focal length of positive lens element 21: | 10.363 |
| Focal length of positive lens element 22: | 13.880 |
| Focal length of negative lens element 23: | −8.555 |
| Focal length of positive lens element 24: | 5.747 |

TABLE 19

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 8.040 | 1.000 | −0.187 |
| 7.638 | 0.950 | −0.308 |
| 7.236 | 0.900 | −0.314 |
| 6.834 | 0.850 | −0.229 |
| 6.432 | 0.800 | −0.137 |
| 6.030 | 0.750 | −0.072 |
| 5.628 | 0.700 | −0.031 |
| 5.226 | 0.650 | −0.006 |
| 4.824 | 0.600 | 0.012 |
| 4.422 | 0.550 | 0.029 |
| 4.020 | 0.500 | 0.047 |
| 3.618 | 0.450 | 0.065 |
| 3.216 | 0.400 | 0.083 |
| 2.814 | 0.350 | 0.099 |
| 2.412 | 0.300 | 0.113 |
| 2.010 | 0.250 | 0.124 |
| 1.608 | 0.200 | 0.133 |
| 1.206 | 0.150 | 0.140 |
| 0.804 | 0.100 | 0.145 |
| 0.402 | 0.050 | 0.148 |
| 0.000 | 0.000 | 0.150 |

TABLE 20

ASPHERICAL SURFACE DATA

| Surf.No. | K | A3 | A4 | A6 |
|---|---|---|---|---|
| 1 | −1.000 | −3.80056E−04 | −4.68585E−05 | 1.63730E−06 |
| 2 | −1.000 | −3.05202E−03 | 9.11228E−04 | −2.25029E−04 |
| 3 | −1.000 | 0.00000E+00 | 8.27426E−03 | −1.03965E−03 |
| 4 | −1.000 | 0.00000E+00 | 1.00936E−02 | −2.07292E−03 |
| 6 | 0.000 | 0.00000E+00 | −1.86732E−03 | 8.29552E−04 |
| 7 | 0.000 | 0.00000E+00 | 8.76462E−04 | 8.31948E−04 |
| 11 | 0.000 | 0.00000E+00 | −2.17872E−03 | −1.56166E−04 |
| 12 | 0.000 | 0.00000E+00 | −1.89998E−02 | 5.03376E−03 |

| Surf.No. | A8 | A10 | A12 |
|---|---|---|---|
| 1 | −1.16499E−06 | 5.17150E−08 | −9.99113E−10 |
| 2 | 7.07205E−06 | 1.41834E−06 | −1.09880E−07 |
| 3 | 7.77080E−05 | −3.09459E−06 | 5.00864E−08 |
| 4 | 2.02109E−04 | −1.02253E−05 | 2.10735E−07 |
| 6 | 2.46472E−04 | −5.28461E−04 | 0.00000E+00 |
| 7 | 1.18117E−05 | −9.06662E−05 | 0.00000E+00 |
| 11 | 1.14937E−04 | −1.13989E−05 | 3.56844E−07 |
| 12 | −8.23333E−04 | 7.83692E−05 | −2.82353E−06 |

| Surf.No. | A14 | A16 | A18 |
|---|---|---|---|
| 1 | 8.12299E−12 | −9.59135E−15 | −1.31691E−16 |
| 2 | 2.23537E−09 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

Numerical Embodiment 5

Figure 9:
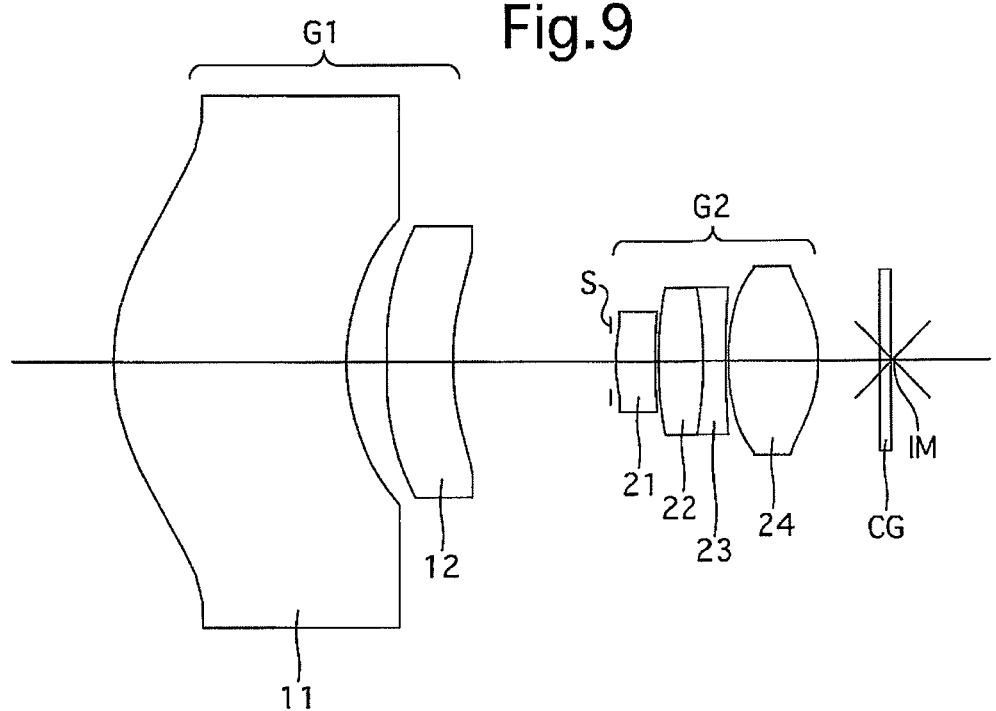
FIG. 9 shows a lens arrangement of a fifth numerical embodiment of an imaging optical system, according to the present invention.
Figure 10A:
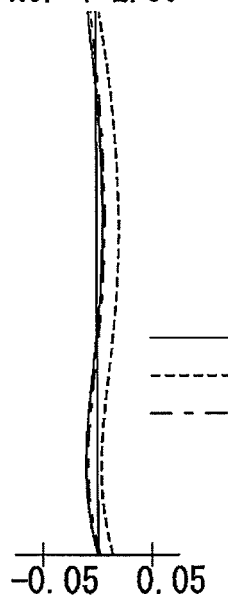
FIGS. 10A, 10B, 10C and 10D show various aberrations that occurred in the lens arrangement of FIG. 9.
Figure 10B:
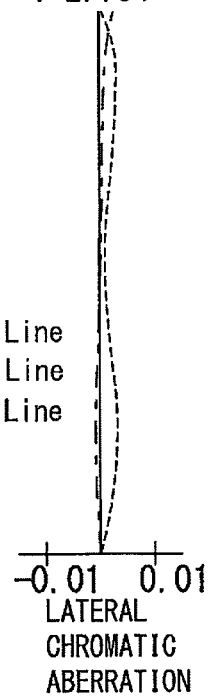
Figure 10C:
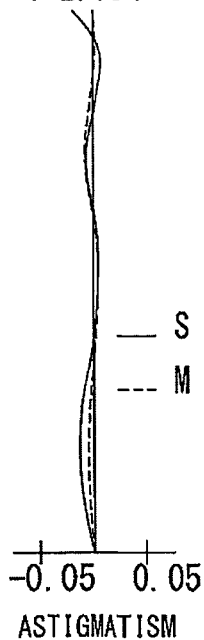
Figure 10D:
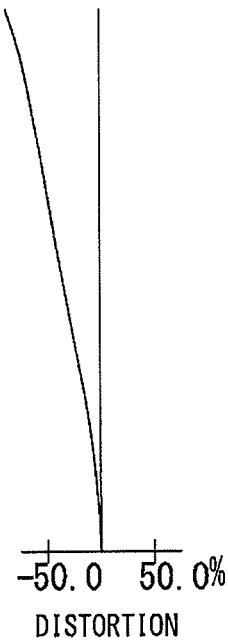

FIGS. 9 through 10D and Tables 21 through 25 show a fifth numerical embodiment of the imaging optical system, according to the present invention. FIG. 9 shows a lens arrangement of the imaging optical system. FIGS. 10A, 10B, 10C and 10D show various aberrations that occurred in the zoom lens system of FIG. 9. Table 21 indicates the surface data, Table 22 indicates various lens system data, Table 23 indicates focal length data, Table 24 indicates curvature data of the meridional cross-section of the aspherical surface on the object side of the positive lens element 11, which provided closest to the object side within the first lens group G1, and Table 25 indicates aspherical surface data.

The fifth numerical embodiment has the same lens arrangement as that of the fourth numerical embodiment.

TABLE 21

SURFACE DATA

| Surf. No. | r | d | N(d) | vd | Effective Aperture |
|---|---|---|---|---|---|
| 1* | 6.829 | 7.732 | 1.55332 | 71.7 | 8.32 |
| 2* | 6.183 | 1.325 | | | 4.71 |
| 3* | 64.504 | 2.223 | 1.82115 | 24.1 | 4.51 |
| 4* | 14.108 | 5.307 | | | 3.66 |
| 5(Diaphragm) | ∞ | 0.180 | | | 0.97 |
| 6* | 5.843 | 1.326 | 1.55332 | 71.7 | 1.19 |
| 7* | 30.876 | 0.100 | | | 1.59 |
| 8 | 12.836 | 1.600 | 1.55032 | 75.5 | 1.69 |
| 9 | −13.093 | 0.700 | 1.92119 | 24.0 | 2.06 |
| 10 | 30.572 | 0.100 | | | 2.31 |
| 11* | 6.037 | 3.012 | 1.55332 | 71.7 | 2.76 |
| 12* | −6.765 | 2.055 | | | 2.90 |
| 13 | ∞ | 0.400 | 1.51680 | 64.2 | 2.80 |
| 14 | ∞ | 0.045 | | | 2.79 |
| IM(Imaging Surface) | | | | | |

The asterisk (*) designates an aspherical surface which is rotationally symmetrical with respect to the optical axis.

TABLE 22

VARIOUS LENS SYSTEM DATA

| | |
|---|---|
| f[mm] | 11.00 |
| FNO. | 2.80 |
| W [°] | 47.5 |
| Y [mm] | 2.784 |
| Value [f/Y] of entire lens system focal length divided by the image height (maximum image height): | 3.95 |
| Height at which the curvature of the meridional cross-section of the aspherical surface on the object side of the positive lens element 11 changes from a positive value to a negative value: | 5.50 [mm] |

TABLE 22-continued

VARIOUS LENS SYSTEM DATA

| | |
|---|---|
| The ratio of the height, relative to the lens effective aperture, at which the curvature of the meridional cross-section of the aspherical surface on the object side of the positive lens element 11 changes from a positive value to a negative value: | 0.66 [66%] |

TABLE 23

FOCAL LENGTH DATA

| | |
|---|---|
| Focal length of first lens group G1: | 215.820 |
| Focal length of second lens group G2: | 5.567 |
| Focal length of positive lens element 11: | 36.190 |
| Focal length of negative lens element 12: | −22.437 |
| Focal length of positive lens element 21: | 12.785 |
| Focal length of positive lens element 22: | 12.041 |
| Focal length of negative lens element 23: | −9.875 |
| Focal length of positive lens element 24: | 6.293 |

TABLE 24

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 8.320 | 1.000 | −0.146 |
| 7.904 | 0.950 | −0.292 |
| 7.488 | 0.900 | −0.313 |
| 7.072 | 0.850 | −0.223 |
| 6.656 | 0.800 | −0.124 |
| 6.240 | 0.750 | −0.056 |
| 5.824 | 0.700 | −0.017 |
| 5.408 | 0.650 | 0.004 |
| 4.992 | 0.600 | 0.017 |
| 4.576 | 0.550 | 0.029 |
| 4.160 | 0.500 | 0.044 |
| 3.744 | 0.450 | 0.061 |
| 3.328 | 0.400 | 0.079 |
| 2.912 | 0.350 | 0.095 |
| 2.496 | 0.300 | 0.109 |
| 2.080 | 0.250 | 0.120 |
| 1.664 | 0.200 | 0.129 |
| 1.248 | 0.150 | 0.135 |
| 0.832 | 0.100 | 0.140 |
| 0.416 | 0.050 | 0.144 |
| 0.000 | 0.000 | 0.146 |

TABLE 25

ASPHERICAL SURFACE DATA

| Surf.No. | K | A3 | A4 | A6 |
|---|---|---|---|---|
| 1 | −1.000 | −6.07307E−04 | −6.73968E−07 | 2.28553E−06 |
| 2 | −1.000 | −4.48173E−03 | 1.88495E−03 | −3.12348E−04 |
| 3 | −1.000 | 0.00000E+00 | 8.18262E−03 | −1.01357E−03 |
| 4 | −1.000 | 0.00000E+00 | 1.01400E−02 | −2.03250E−03 |
| 6 | 0.000 | 0.00000E+00 | −3.07212E−03 | 8.04937E−03 |
| 7 | 0.000 | 0.00000E+00 | 1.65885E−03 | −3.49008E−04 |
| 11 | 0.000 | 0.00000E+00 | −1.74966E−03 | −1.58221E−04 |
| 12 | 0.000 | 0.00000E+00 | −2.10257E−02 | 5.31297E−03 |

| Surf.No. | A8 | A10 | A12 |
|---|---|---|---|
| 1 | −1.18627E−06 | 5.19620E−08 | −9.79625E−10 |
| 2 | 1.27492E−05 | 1.38634E−06 | −1.15410E−07 |
| 3 | 7.75466E−05 | −3.11619E−06 | 4.97278E−08 |
| 4 | 1.96738E−04 | −9.93824E−06 | 2.04916E−07 |

TABLE 25-continued

ASPHERICAL SURFACE DATA

| | | | |
|---|---|---|---|
| 6 | −1.20644E−02 | 8.50351E−03 | −2.42048E−03 |
| 7 | 1.16750E−03 | −5.18442E−04 | 4.86992E−05 |
| 11 | 1.00942E−04 | −8.96702E−06 | 2.37046E−07 |
| 12 | −8.43334E−04 | 7.78481E−05 | −2.74338E−06 |

| Surf.No. | A14 | A16 | A18 |
|---|---|---|---|
| 1 | 7.92505E−12 | −1.38974E−14 | −8.49025E−17 |
| 2 | 2.30718E−09 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

Numerical Embodiment 6

Figure 11:
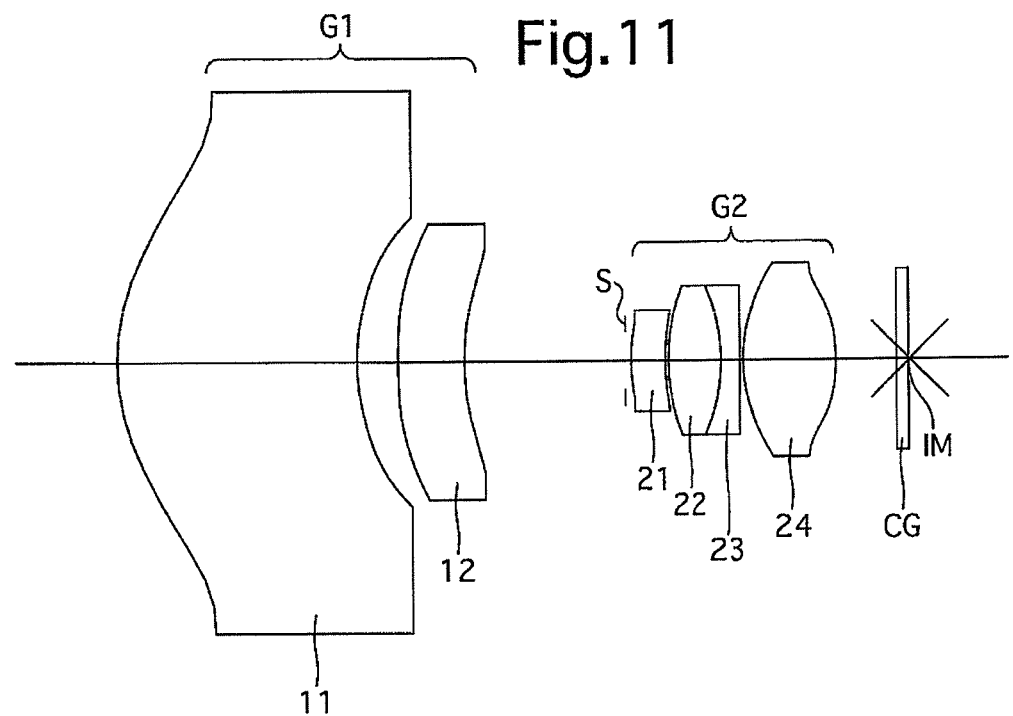
FIG. 11 shows a lens arrangement of a sixth numerical embodiment of an imaging optical system, according to the present invention.
Figure 12A:
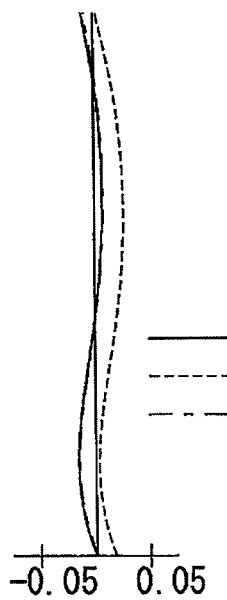
FIGS. 12A, 12B, 12C and 12D show various aberrations that occurred in the lens arrangement of FIG. 11.
Figure 12B:
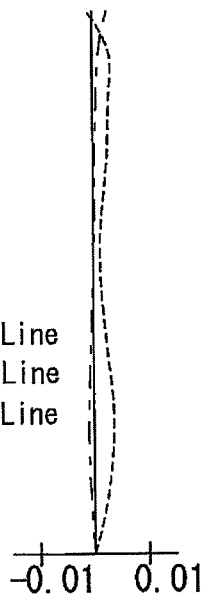
Figure 12C:
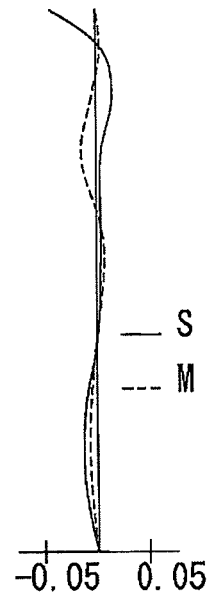
Figure 12D:
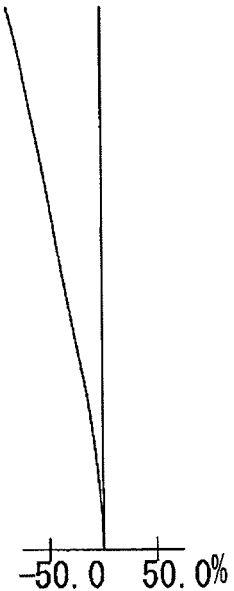

FIGS. 11 through 12D and Tables 26 through 30 show a sixth numerical embodiment of the imaging optical system, according to the present invention. FIG. 11 shows a lens arrangement of the imaging optical system. FIGS. 12A, 12B, 12C and 12D show various aberrations that occurred in the zoom lens system of FIG. 11. Table 26 indicates the surface data, Table 27 indicates various lens system data, Table 28 indicates focal length data, Table 29 indicates curvature data of the meridional cross-section of the aspherical surface on the object side of the positive lens element 11, which provided closest to the object side within the first lens group G1, and Table 30 indicates aspherical surface data.

The sixth numerical embodiment has the same lens arrangement as those of the fourth and fifth numerical embodiments except for the following features:

(1) The negative lens element 23 of the second lens group G2 has a meniscus profile having a convex surface on the image side at the paraxial portion thereof.

TABLE 26

SURFACE DATA

| Surf. No. | r | d | N(d) | vd | Effective Aperture |
|---|---|---|---|---|---|
| 1* | 7.020 | 7.972 | 1.55332 | 71.7 | 8.54 |
| 2* | 6.905 | 1.357 | | | 4.78 |
| 3* | 44.634 | 2.206 | 1.82115 | 24.1 | 4.58 |
| 4* | 11.929 | 5.380 | | | 3.73 |
| 5(Diaphragm) | ∞ | 0.187 | | | 0.98 |
| 6* | 5.89 | 1.169 | 1.55332 | 71.7 | 1.21 |
| 7* | 8.86 | 0.100 | | | 1.60 |
| 8 | 6.835 | 1.806 | 1.55032 | 75.5 | 1.73 |
| 9 | −6.811 | 0.700 | 2.00100 | 29.1 | 2.07 |
| 10 | −126.059 | 0.100 | | | 2.35 |
| 11* | 5.549 | 3.072 | 1.55332 | 71.7 | 2.90 |
| 12* | −7.842 | 2.055 | | | 2.97 |
| 13 | ∞ | 0.400 | 1.51680 | 64.2 | 2.80 |
| 14 | ∞ | 0.045 | | | 2.79 |
| IM (Imaging Surface) | | | | | |

The asterisk (*) designates an aspherical surface which is rotationally symmetrical with respect to the optical axis.

TABLE 27

VARIOUS LENS SYSTEM DATA

| | |
|---|---|
| f[mm] | 11.70 |
| FNO. | 2.80 |
| W [°] | 47.5 |
| Y [mm] | 2.784 |

TABLE 27-continued

VARIOUS LENS SYSTEM DATA

| | | |
|---|---|---|
| Value [f/Y] of entire lens system focal length divided by the image height (maximum image height): | 4.20 | |
| Height at which the curvature of the meridional cross-section of the aspherical surface on the object side of the positive lens element 11 changes from a positive value to a negative value: | 6.04 | [mm] |
| The ratio of the height, relative to the lens effective aperture, at which the curvature of the meridional cross-section of the aspherical surface on the object side of the positive lens element 11 changes from a positive value to a negative value: | 0.71 | [71%] |

TABLE 28

FOCAL LENGTH DATA

| | |
|---|---|
| Focal length of first lens group G1: | 150.924 |
| Focal length of second lens group G2: | 5.700 |
| Focal length of positive lens element 11: | 32.160 |
| Focal length of negative lens element 12: | −20.448 |
| Focal length of positive lens element 21: | 27.846 |
| Focal length of positive lens element 22: | 3.925 |
| Focal length of negative lens element 23: | −7.214 |
| Focal length of positive lens element 24: | 6.395 |

TABLE 29

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 8.540 | 1.000 | −0.125 |
| 8.113 | 0.950 | −0.295 |
| 7.686 | 0.900 | −0.333 |
| 7.259 | 0.850 | −0.229 |
| 6.832 | 0.800 | −0.114 |
| 6.405 | 0.750 | −0.037 |
| 5.978 | 0.700 | 0.004 |
| 5.551 | 0.650 | 0.023 |
| 5.124 | 0.600 | 0.031 |
| 4.697 | 0.550 | 0.039 |
| 4.270 | 0.500 | 0.049 |
| 3.843 | 0.450 | 0.063 |
| 3.416 | 0.400 | 0.079 |
| 2.989 | 0.350 | 0.094 |
| 2.562 | 0.300 | 0.107 |
| 2.135 | 0.250 | 0.117 |
| 1.708 | 0.200 | 0.125 |
| 1.281 | 0.150 | 0.131 |
| 0.854 | 0.100 | 0.136 |
| 0.427 | 0.050 | 0.140 |
| 0.000 | 0.000 | 0.142 |

TABLE 30

ASPHERICAL SURFACE DATA

| Surf.No. | K | A3 | A4 | A6 |
|---|---|---|---|---|
| 1 | −1.000 | −8.41842E−04 | 5.97786E−05 | 3.44054E−06 |
| 2 | −1.000 | −5.90871E−03 | 3.02829E−03 | −3.92494E−04 |
| 3 | −1.000 | 0.00000E+00 | 8.06947E−03 | −1.03001E−03 |
| 4 | −1.000 | 0.00000E+00 | 1.00735E−02 | −2.14946E−03 |
| 6 | 0.000 | 0.00000E+00 | −4.32775E−03 | 8.95263E−03 |
| 7 | 0.000 | 0.00000E+00 | 1.51607E−04 | −6.02790E−04 |
| 11 | 0.000 | 0.00000E+00 | −2.27262E−03 | −1.56308E−04 |
| 12 | 0.000 | 0.00000E+00 | −2.26415E−02 | 5.66259E−03 |

TABLE 30-continued

ASPHERICAL SURFACE DATA

| Surf.No. | A8 | A10 | A12 |
|---|---|---|---|
| 1 | −1.20121E−06 | 5.22291E−08 | −9.74409E−10 |
| 2 | 1.68137E−05 | 1.41112E−06 | −1.21048E−07 |
| 3 | 7.98873E−05 | −3.21216E−06 | 5.09070E−08 |
| 4 | 2.10438E−04 | −1.05751E−05 | 2.15786E−07 |
| 6 | −1.30761E−02 | 9.06162E−03 | −2.53424E−03 |
| 7 | 1.38593E−03 | −6.23318E−04 | 6.59382E−05 |
| 11 | 8.36140E−05 | −6.18875E−06 | 1.32104E−07 |
| 12 | −8.75460E−04 | 7.77524E−05 | −2.62727E−06 |

| Surf.No. | A14 | A16 | A18 |
|---|---|---|---|
| 1 | 7.80981E−12 | −1.50121E−14 | −6.81051E−17 |
| 2 | 2.37607E−09 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

Numerical Embodiment 7

FIGS. 13 through 14D and Tables 31 through 35 show a seventh numerical embodiment of the imaging optical system, according to the present invention. FIG. 13 shows a lens arrangement of the imaging optical system. FIGS. 14A, 14B, 14C and 14D show various aberrations that occurred in the zoom lens system of FIG. 13. Table 31 indicates the surface data, Table 32 indicates various lens system data, Table 33 indicates focal length data, Table 34 indicates curvature data of the meridional cross-section of the aspherical surface on the object side of the positive lens element 11, which provided closest to the object side within the first lens group G1, and Table 35 indicates aspherical surface data.

The seventh numerical embodiment has the same lens arrangement as those of the first through third numerical embodiments except for the following features:

(1) The negative lens element 12 of the first lens group G1 has a biconcave profile at the paraxial portion thereof.

(2) The second lens group G2 is configured of a positive lens element 21' formed from an aspherical glass molded lens element (having an aspherical surface on each side thereof), a negative lens element 22' formed from a spherical glass lens element, and a positive lens element 23' formed from an aspherical glass molded lens element (having an aspherical surface on each side thereof), in that order from the object side. The positive lens element 21' has a biconvex profile at the paraxial portion thereof. The negative lens element 22' has a meniscus profile having a convex surface on the object side at the paraxial portion thereof. The positive lens element 23' has a biconvex profile at the paraxial portion thereof.

TABLE 31

SURFACE DATA

| Surf. No. | r | d | N(d) | vd | Effective Aperture |
|---|---|---|---|---|---|
| 1* | 5.767 | 4.785 | 1.55332 | 71.7 | 7.20 |
| 2* | 5.076 | 3.536 | | | 4.70 |
| 3* | −33.854 | 3.374 | 1.68893 | 31.2 | 4.03 |
| 4* | 50.331 | 4.289 | | | 3.01 |
| 5(Diaphragm) | ∞ | 0.547 | | | 1.01 |

TABLE 31-continued

SURFACE DATA

| Surf. No. | r | d | N(d) | vd | Effective Aperture |
|---|---|---|---|---|---|
| 6* | 5.32 | 1.738 | 1.55332 | 71.7 | 1.52 |
| 7* | −6.108 | 0.732 | | | 1.86 |
| 8 | 85.462 | 0.700 | 1.80809 | 22.8 | 2.09 |
| 9 | 6.679 | 0.315 | | | 2.21 |
| 10* | 8.614 | 2.467 | 1.55332 | 71.7 | 2.39 |
| 11* | −8.288 | 2.072 | | | 2.71 |
| 12 | ∞ | 0.400 | 1.51680 | 64.2 | 2.78 |
| 13 | ∞ | 0.045 | | | 2.79 |
| IM(Imaging Surface) | | | | | |

The asterisk (*) designates an aspherical surface which is rotationally symmetrical with respect to the optical axis.

TABLE 32

VARIOUS LENS SYSTEM DATA

| | |
|---|---|
| f [mm] | 9.00 |
| FNO. | 2.80 |
| W [°] | 47.5 |
| Y [mm] | 2.784 |
| Value [f/Y] of entire lens system focal length divided by the image height (maximum image height): | 3.23 |
| Height at which the curvature of the meridional cross-section of the aspherical surface on the object side of the positive lens element 11 changes from a positive value to a negative value: | 5.09 [mm] |
| The ratio of the height, relative to the lens effective aperture, at which the curvature of the meridional cross-section of the aspherical surface on the object side of the positive lens element 11 changes from a positive value to a negative value: | 0.71 [71%] |

TABLE 33

FOCAL LENGTH DATA

| | |
|---|---|
| Focal length of first lens group G1: | −425.785 |
| Focal length of second lens group G2: | 5.637 |
| Focal length of positive lens element 11: | 52.204 |
| Focal length of negative lens element 12: | −28.906 |
| Focal length of positive lens element 21′: | 5.433 |
| Focal length of negative lens element 22′: | −9.002 |
| Focal length of positive lens element 23′: | 8.053 |

TABLE 34

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 7.200 | 1.000 | −0.282 |
| 6.840 | 0.950 | −0.357 |
| 6.480 | 0.900 | −0.299 |
| 6.120 | 0.850 | −0.194 |
| 5.760 | 0.800 | −0.103 |
| 5.400 | 0.750 | −0.039 |
| 5.040 | 0.700 | 0.005 |
| 4.680 | 0.650 | 0.035 |
| 4.320 | 0.600 | 0.058 |
| 3.960 | 0.550 | 0.076 |
| 3.600 | 0.500 | 0.092 |
| 3.240 | 0.450 | 0.106 |
| 2.880 | 0.400 | 0.119 |
| 2.520 | 0.350 | 0.131 |
| 2.160 | 0.300 | 0.141 |
| 1.800 | 0.250 | 0.150 |
| 1.440 | 0.200 | 0.158 |
| 1.080 | 0.150 | 0.164 |
| 0.720 | 0.100 | 0.169 |
| 0.360 | 0.050 | 0.172 |
| 0.000 | 0.000 | 0.173 |

TABLE 35

ASPHERICAL SURFACE DATA

| Surf. No. | κ | A3 | A4 | A6 |
|---|---|---|---|---|
| 1 | −1.000 | −8.23041E−05 | 7.00905E−07 | 5.65264E−06 |
| 2 | −1.000 | −5.08344E−04 | −3.41674E−04 | 7.93703E−05 |
| 3 | −1.000 | 0.00000E+00 | 2.86031E−03 | −9.24875E−05 |
| 4 | −1.000 | 0.00000E+00 | 2.35317E−03 | −4.55561E−04 |
| 6 | 0.000 | 0.00000E+00 | −3.24229E−03 | −3.07854E−04 |
| 7 | 0.000 | 0.00000E+00 | 2.37758E−03 | −2.20321E−04 |
| 10 | 0.000 | 0.00000E+00 | −3.60292E−04 | 1.34459E−03 |
| 11 | 0.000 | 0.00000E+00 | −2.05502E−02 | 5.05222E−03 |

| Surf. No. | A8 | A10 | A12 |
|---|---|---|---|
| 1 | −1.02244E−06 | 4.54297E−08 | −1.09151E−09 |
| 2 | −6.90040E−06 | 9.07237E−07 | −5.26223E−08 |
| 3 | −1.68689E−06 | 8.75093E−08 | 0.00000E+00 |
| 4 | 2.98937E−05 | 8.11515E−07 | 0.00000E+00 |
| 6 | −9.15142E−05 | 0.00000E+00 | 0.00000E+00 |
| 7 | −1.43761E−04 | 0.00000E+00 | 0.00000E+00 |
| 10 | −4.39174E−04 | 6.25012E−05 | −3.84598E−06 |
| 11 | −7.41569E−04 | 6.35498E−05 | −2.51475E−06 |

| Surf. No. | A14 | A16 | A18 |
|---|---|---|---|
| 1 | 9.71866E−12 | 2.82733E−14 | −6.07124E−16 |
| 2 | 9.69389E−10 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 10 | 0.00000E+00 | 0.00000E+00 | 0.00000E+00 |
| 11 | 0.00000E+00 | 0.00000E+00 | 0.00000E+00 |

Numerical Embodiment 8

Figure 15:
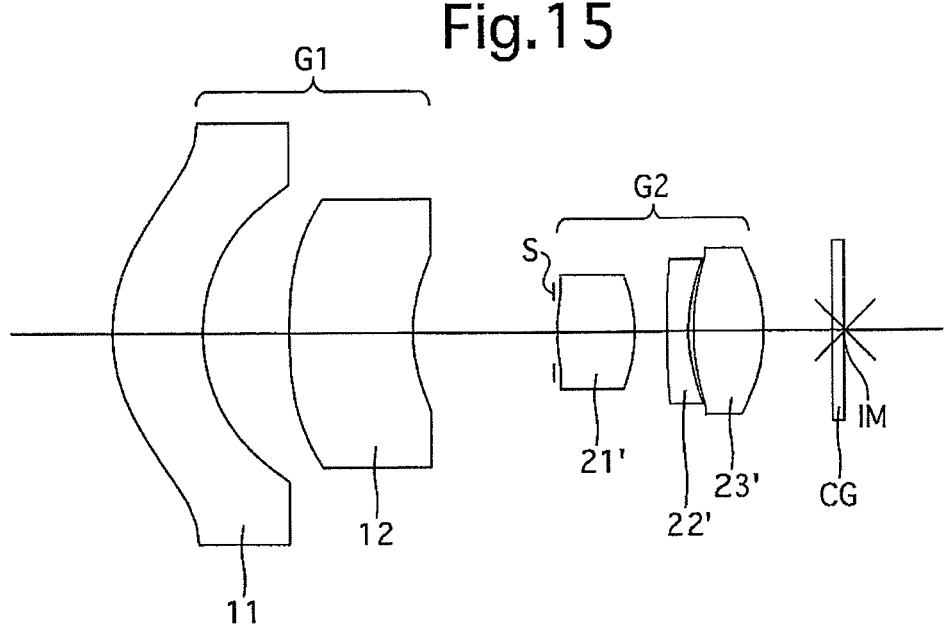
FIG. 15 shows a lens arrangement of an eighth numerical embodiment of an imaging optical system, according to the present invention.
Figure 16A:
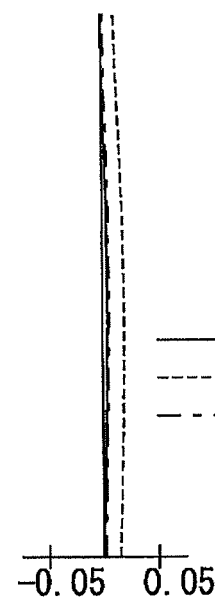
FIGS. 16A, 16B, 16C and 16D show various aberrations that occurred in the lens arrangement of FIG. 15.
Figure 16B:
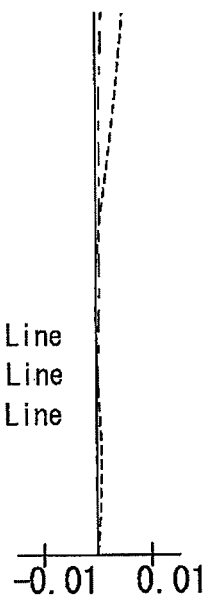
Figure 16C:
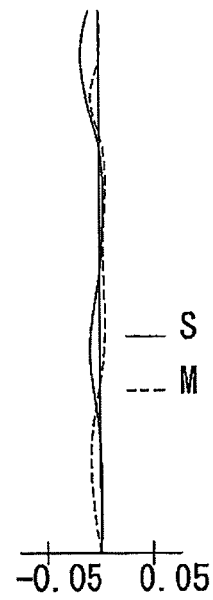
Figure 16D:
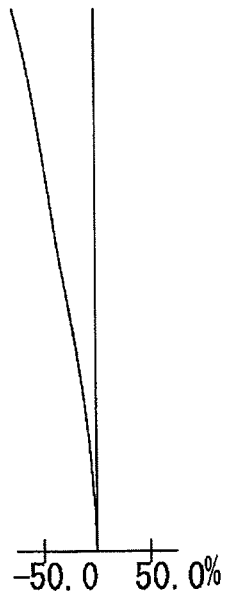

FIGS. 15 through 16D and Tables 36 through 40 show an eighth numerical embodiment of the imaging optical system, according to the present invention. FIG. 15 shows a lens arrangement of the imaging optical system. FIGS. 16A, 16B, 16C and 16D show various aberrations that occurred in the zoom lens system of FIG. 15. Table 36 indicates the surface data, Table 37 indicates various lens system data, Table 38 indicates focal length data, Table 39 indicates curvature data of the meridional cross-section of the aspherical surface on the object side of the positive lens element 11, which provided closest to the object side within the first lens group G1, and Table 40 indicates aspherical surface data.

The eighth numerical embodiment has the same lens arrangement as that of the seventh numerical embodiment except for the following feature:

(1) The negative lens element 12 of the first lens group G1 has a meniscus profile with a concave surface on the image side at the paraxial portion thereof.

TABLE 36

SURFACE DATA

| Surf. No. | r | d | N(d) | vd | Effective Aperture |
|---|---|---|---|---|---|
| 1* | 5.271 | 2.940 | 1.55332 | 71.7 | 6.62 |
| 2* | 5.286 | 2.873 | | | 4.79 |
| 3* | 17.931 | 4.159 | 1.68893 | 31.2 | 4.33 |
| 4* | 5.419 | 4.698 | | | 2.60 |
| 5 (Diaphragm) | ∞ | 0.104 | | | 1.08 |
| 6* | 6.102 | 2.602 | 1.55332 | 71.7 | 1.22 |
| 7* | −4.635 | 1.136 | | | 1.84 |
| 8 | 27.809 | 0.700 | 1.80809 | 22.8 | 2.20 |
| 9 | 6.028 | 0.165 | | | 2.30 |
| 10* | 7.994 | 2.338 | 1.55332 | 71.7 | 2.37 |
| 11* | −9.188 | 2.328 | | | 2.64 |
| 12 | ∞ | 0.400 | 1.51680 | 64.2 | 2.77 |
| 13 | ∞ | 0.045 | | | 2.78 |

IM(Imaging Surface)
The asterisk (*) designates an aspherical surface which is rotationally symmetrical with respect to the optical axis.

TABLE 37

VARIOUS LENS SYSTEM DATA

| | |
|---|---|
| f [mm] | 8.00 |
| FNO. | 2.81 |
| W [°] | 47.5 |
| Y [mm] | 2.784 |
| Value [f/Y] of entire lens system focal length divided by the image height (maximum image height): | 2.87 |
| Height at which the curvature of the meridional cross-section of the aspherical surface on the object side of the positive lens element 11 changes from a positive value to a negative value: | 4.39 [mm] |
| The ratio of the height, relative to the lens effective aperture, at which the curvature of the meridional cross-section of the aspherical surface on the object side of the positive lens element 11 changes from a positive value to a negative value: | 0.66 [66%] |

TABLE 38

FOCAL LENGTH DATA

| | |
|---|---|
| Focal length of first lens group G1: | −34.349 |
| Focal length of second lens group G2: | 5.289 |
| Focal length of positive lens element 11: | 47.419 |
| Focal length of negative lens element 12: | −13.041 |
| Focal length of positive lens element 21': | 5.211 |
| Focal length of negative lens element 22': | −9.663 |
| Focal length of positive lens element 23': | 8.119 |

TABLE 39

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 6.620 | 1.000 | −0.332 |
| 6.289 | 0.950 | −0.335 |
| 5.958 | 0.900 | −0.278 |
| 5.627 | 0.850 | −0.198 |
| 5.296 | 0.800 | −0.127 |
| 4.965 | 0.750 | −0.070 |
| 4.634 | 0.700 | −0.026 |
| 4.303 | 0.650 | 0.009 |
| 3.972 | 0.600 | 0.038 |
| 3.641 | 0.550 | 0.064 |
| 3.310 | 0.500 | 0.087 |
| 2.979 | 0.450 | 0.107 |
| 2.648 | 0.400 | 0.124 |
| 2.317 | 0.350 | 0.138 |
| 1.986 | 0.300 | 0.150 |
| 1.655 | 0.250 | 0.159 |
| 1.324 | 0.200 | 0.166 |
| 0.993 | 0.150 | 0.172 |
| 0.662 | 0.100 | 0.178 |
| 0.331 | 0.050 | 0.184 |
| 0.000 | 0.000 | 0.190 |

TABLE 40

ASPHERICAL SURFACE DATA

| Surf. No. | κ | A3 | A4 | A6 |
|---|---|---|---|---|
| 1 | −1.000 | −2.64797E−03 | 6.31639E−04 | −6.70790E−06 |
| 2 | −1.000 | −4.95585E−03 | 1.83934E−03 | 7.81713E−05 |
| 3 | −1.000 | 0.00000E+00 | 2.14392E−03 | −3.34260E−05 |
| 4 | −1.000 | 0.00000E+00 | 1.53320E−03 | −4.69685E−04 |
| 6 | 0.000 | 0.00000E+00 | −3.55892E−03 | 5.13818E−05 |
| 7 | 0.000 | 0.00000E+00 | 2.91219E−03 | −3.63311E−05 |
| 10 | 0.000 | 0.00000E+00 | −8.35728E−05 | 1.01615E−03 |
| 11 | 0.000 | 0.00000E+00 | −1.66114E−02 | 3.83103E−03 |

| Surf. No. | A8 | A10 | A12 |
|---|---|---|---|
| 1 | −1.86775E−06 | 8.16489E−08 | −1.64775E−09 |
| 2 | −1.58449E−05 | 1.39356E−06 | −5.28451E−08 |
| 3 | −4.55573E−07 | 1.59491E−08 | 0.00000E+00 |
| 4 | 3.39062E−05 | −7.69176E−07 | 0.00000E+00 |
| 6 | −1.10728E−04 | 0.00000E+00 | 0.00000E+00 |
| 7 | −6.04340E−05 | 0.00000E+00 | 0.00000E+00 |
| 10 | −2.91007E−04 | 3.73162E−05 | −1.94978E−06 |
| 11 | −5.59721E−04 | 4.75497E−05 | −1.73329E−06 |

| Surf. No. | A14 | A16 | A18 |
|---|---|---|---|
| 1 | 1.12765E−11 | 1.07069E−13 | −1.44916E−15 |
| 2 | 7.06666E−10 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 6 | 0.00000E+00 | 0.00000E+00 | 0.00000E+00 |
| 7 | 0.00000E+00 | 0.00000E+00 | 0.00000E+00 |
| 10 | 0.00000E+00 | 0.00000E+00 | 0.00000E+00 |
| 11 | 0.00000E+00 | 0.00000E+00 | 0.00000E+00 |

Numerical Embodiment 9

Figure 17:
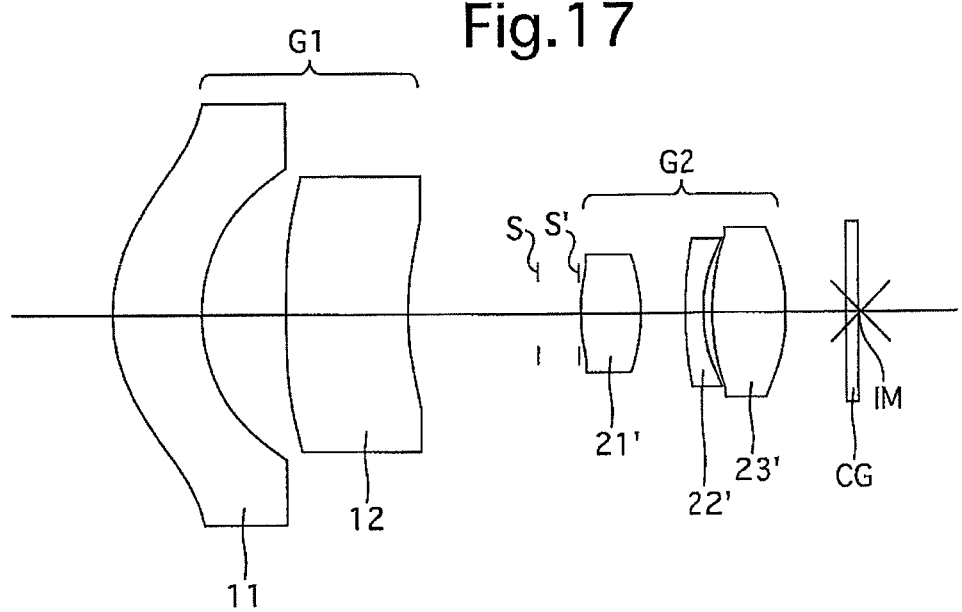
FIG. 17 shows a lens arrangement of a ninth numerical embodiment of an imaging optical system, according to the present invention.
Figure 18A:
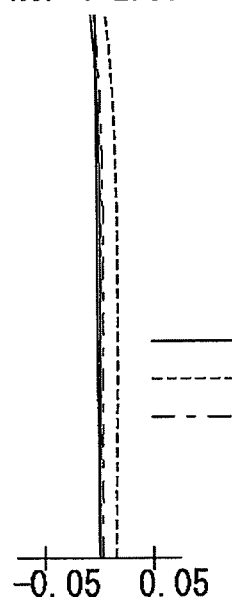
FIGS. 18A, 18B, 18C and 18D show various aberrations that occurred in the lens arrangement of FIG. 17.
Figure 18B:
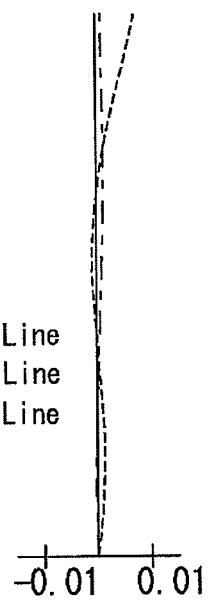
Figure 18C:
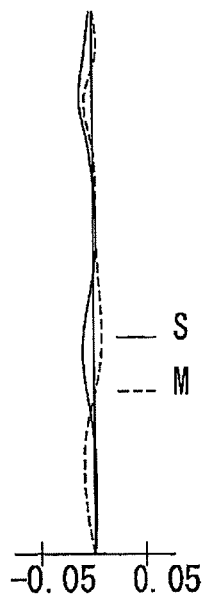
Figure 18D:
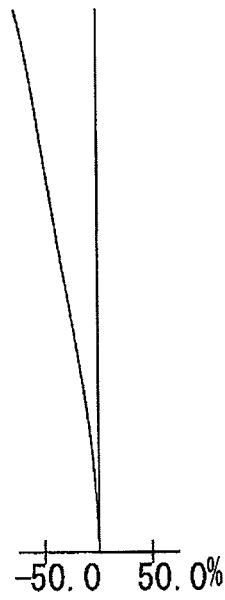

FIGS. 17 through 18D and Tables 41 through 45 show a ninth numerical embodiment of the imaging optical system, according to the present invention. FIG. 17 shows a lens arrangement of the imaging optical system. FIGS. 18A, 18B, 18C and 18D show various aberrations that occurred in the zoom lens system of FIG. 17. Table 41 indicates the surface data, Table 42 indicates various lens system data, Table 43 indicates focal length data, Table 44 indicates curvature data of the meridional cross-section of the aspherical surface on the object side of the positive lens element 11, which provided closest to the object side within the first lens group G1, and Table 45 indicates aspherical surface data.

The ninth numerical embodiment has the same lens arrangement as that of the eighth numerical embodiment except for the following feature:

(1) A second aperture diaphragm S' is provided in between the aperture diaphragm S and the second lens group G2 (immediately in front of the second lens group G2).

TABLE 41

SURFACE DATA

| Surf. No. | r | d | N(d) | vd | Effective Aperture |
|---|---|---|---|---|---|
| 1* | 5.450 | 2.961 | 1.58313 | 59.5 | 6.51 |
| 2* | 5.666 | 2.762 | | | 4.66 |
| 3* | 316.697 | 4.034 | 1.68893 | 31.2 | 4.34 |
| 4* | 9.448 | 4.356 | | | 2.95 |
| 5 (Diaphragm) | ∞ | 1.025 | | | 1.10 |
| 6 (Diaphragm) | ∞ | 0.405 | | | 1.14 |
| 7* | 6.156 | 2.009 | 1.55332 | 71.7 | 1.50 |
| 8* | −5.677 | 1.511 | | | 1.90 |
| 9 | 11.6 | 0.700 | 1.94595 | 18.0 | 2.34 |
| 10 | 5.554 | 0.266 | | | 2.34 |
| 11* | 9.201 | 2.470 | 1.55332 | 71.7 | 2.42 |
| 12* | −11.24 | 2.000 | | | 2.69 |
| 13 | ∞ | 0.400 | 1.51680 | 64.2 | 2.77 |
| 14 | ∞ | 0.100 | | | 2.78 |

IM(Imaging Surface)
The asterisk (*) designates an aspherical surface which is rotationally symmetrical with respect to the optical axis.

TABLE 42

VARIOUS LENS SYSTEM DATA

| | |
|---|---|
| f[mm] | 8.00 |
| FNO. | 2.81 |
| W [°] | 47.5 |
| Y [mm] | 2.784 |
| Value [f/Y] of entire lens system focal length divided by the image height (maximum image height): | 2.87 |
| Height at which the curvature of the meridional cross-section of the aspherical surface on the object side of the positive lens element 11 changes from a positive value to a negative value: | 4.54 [mm] |
| The ratio of the height, relative to the lens effective aperture, at which the curvature of the meridional cross-section of the aspherical surface on the object side of the positive lens element 11 changes from a positive value to a negative value: | 0.70 [70%] |

TABLE 43

FOCAL LENGTH DATA

| | |
|---|---|
| Focal length of first lens group G1: | −44.384 |
| Focal length of second lens group G2: | 5.655 |
| Focal length of positive lens element 11: | 40.548 |
| Focal length of negative lens element 12: | −14.212 |
| Focal length of positive lens element 21': | 5.681 |
| Focal length of negative lens element 22': | −11.935 |
| Focal length of positive lens element 23': | 9.555 |

TABLE 44

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 6.510 | 1.000 | −0.232 |
| 6.185 | 0.950 | −0.252 |
| 5.859 | 0.900 | −0.212 |
| 5.534 | 0.850 | −0.149 |
| 5.208 | 0.800 | −0.089 |

TABLE 44-continued

CURVATURE DATA OF MERIDIONAL CROSS-SECTION OF ASPHERICAL SURFACE ON OBJECT SIDE OF POSITIVE LENS ELEMENT 11

| Distance from Optical Axis | Ratio to Lens Effective Aperture | Curvature of Meridional Cross-Section |
|---|---|---|
| 4.883 | 0.750 | −0.040 |
| 4.557 | 0.700 | −0.001 |
| 4.232 | 0.650 | 0.030 |
| 3.906 | 0.600 | 0.057 |
| 3.581 | 0.550 | 0.080 |
| 3.255 | 0.500 | 0.101 |
| 2.930 | 0.450 | 0.119 |
| 2.604 | 0.400 | 0.134 |
| 2.279 | 0.350 | 0.146 |
| 1.953 | 0.300 | 0.154 |
| 1.628 | 0.250 | 0.161 |
| 1.302 | 0.200 | 0.165 |
| 0.977 | 0.150 | 0.169 |
| 0.651 | 0.100 | 0.173 |
| 0.326 | 0.050 | 0.178 |
| 0.000 | 0.000 | 0.183 |

TABLE 45

ASPHERICAL SURFACE DATA

| Surf. No. | κ | A3 | A4 | A6 |
|---|---|---|---|---|
| 1 | −1.000 | −2.89298E−03 | 9.50491E−04 | −1.24181E−05 |
| 2 | −1.000 | −5.54668E−03 | 2.87774E−03 | 2.67249E−05 |
| 3 | −1.000 | 0.00000E+00 | 2.63174E−03 | −1.13023E−04 |
| 4 | −1.000 | 0.00000E+00 | 8.27717E−04 | −2.76696E−04 |
| 7 | 0.000 | 0.00000E+00 | −2.90329E−03 | −1.79388E−04 |
| 8 | 0.000 | 0.00000E+00 | 1.81098E−03 | −2.28901E−04 |
| 11 | 0.000 | 0.00000E+00 | 1.13985E−04 | 9.68772E−04 |
| 12 | 0.000 | 0.00000E+00 | −1.89986E−02 | 4.26755E−03 |

| Surf. No. | A8 | A10 | A12 |
|---|---|---|---|
| 1 | −1.73384E−06 | 8.47286E−08 | −2.01585E−09 |
| 2 | −1.46170E−05 | 1.43244E−06 | −5.65306E−08 |
| 3 | 3.39210E−06 | −7.44324E−08 | 0.00000E+00 |
| 4 | 1.45274E−05 | −3.38235E−07 | 0.00000E+00 |
| 7 | −9.01462E−06 | 0.00000E+00 | 0.00000E+00 |
| 8 | −2.47345E−05 | 0.00000E+00 | 0.00000E+00 |
| 11 | −2.27813E−04 | 2.44565E−05 | −1.04221E−06 |
| 12 | −5.50878E−04 | 3.97413E−05 | −1.20401E−06 |

| Surf. No. | A14 | A16 | A18 |
|---|---|---|---|
| 1 | 2.05276E−11 | 2.50203E−14 | −1.28769E−15 |
| 2 | 7.85141E−10 | 0.00000E+00 | 0.00000E+00 |
| 3 | 0.00000E+00 | 0.00000E+00 | 0.00000E+00 |
| 4 | 0.00000E+00 | 0.00000E+00 | 0.00000E+00 |
| 7 | 0.00000E+00 | 0.00000E+00 | 0.00000E+00 |
| 8 | 0.00000E+00 | 0.00000E+00 | 0.00000E+00 |
| 11 | 0.00000E+00 | 0.00000E+00 | 0.00000E+00 |
| 12 | 0.00000E+00 | 0.00000E+00 | 0.00000E+00 |

The numerical values of each condition for each embodiment are shown in Table 46.

TABLE 46

| | Embod. 1 | Embod. 2 | Embod. 3 | Embod. 4 | Embod. 5 |
|---|---|---|---|---|---|
| Condition (1) | 0.67 | 0.66 | 0.63 | 0.64 | 0.62 |
| Condition (2) | 0.71 | 0.69 | 0.68 | 0.72 | 0.70 |
| Condition (3) | 14.51 | 8.29 | 4.98 | 3.91 | 3.29 |
| Condition (4) | 71.7 | 71.7 | 71.7 | 71.7 | 71.7 |
| Condition (5) | −1.76 | −0.51 | −0.01 | 0.04 | 0.17 |
| Condition (6) | 0.19 | 0.15 | 0.11 | 0.08 | 0.05 |

TABLE 46-continued

|              | Embod. 6 | Embod. 7 | Embod. 8 | Embod. 9 |
|--------------|----------|----------|----------|----------|
| Condition (1) | 0.60    | 0.64     | 0.66     | 0.68     |
| Condition (2) | 0.68    | 0.53     | 0.37     | 0.37     |
| Condition (3) | 2.75    | 5.80     | 5.93     | 5.07     |
| Condition (4) | 71.7    | 71.7     | 71.7     | 71.7     |
| Condition (5) | 0.21    | −0.12    | −1.38    | −0.91    |
| Condition (6) | 0.01    | 0.06     | 0.00     | −0.02    |

As can be understood from Table 46, the first through ninth numerical embodiments satisfy conditions (1) through (6). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging optical system comprising:
a negative first lens group, an aperture diaphragm, and a positive second lens group, in that order from the object side,
wherein said first lens group comprises a positive lens element provided closest to the object side,
wherein said positive lens element that is provided closest to the object side within said first lens group includes an aspherical surface on the object side thereof, said aspherical surface including a paraxial convex surface convexing toward the object side, and
wherein said aspherical surface on the object side of said positive lens element that is provided closest to the object side within said first lens group has a curvature that is positive along a meridional cross-section at the paraxial portion thereof, and the curvature of the meridional cross-section changes from a positive value to a negative value in an area within 75% of an effective aperture from the paraxial portion toward the periphery of the aspherical surface.

2. The imaging optical system according to claim 1, wherein said aspherical surface on the object side of said positive lens element that is provided closest to the object side within said first lens group has a curvature that is positive along a meridional cross-section at the paraxial portion thereof, and the curvature of the meridional cross-section changes from a positive value to a negative value in an area within 50% to 75% of an effective aperture from the paraxial portion toward the periphery of the aspherical surface.

3. The imaging optical system according to claim 1, wherein the following conditions (1), (2), (3) and (4) are satisfied:

$$R1/f<1.4 \qquad (1),$$

$$D1/f>0.2 \qquad (2),$$

$$f1/f<20 \qquad (3), \text{ and}$$

$$V>56 \qquad (4), \text{ wherein}$$

f designates the focal length of the entire imaging optical system,
f1 designates the focal length of said positive lens element that is provided closest to the object side within said first lens group,
R1 designates the paraxial radius of curvature of the surface on the object side of said positive lens element provided closest to the object side within said first lens group,
D1 designates the thickness along the optical axis of said positive lens element provided closest to the object side within said first lens group, and
V designates the Abbe number with respect to the d-line of the lens element that is provided closest to the aperture diaphragm within said second lens group.

4. The imaging optical system according to claim 1, wherein the following condition (5) is satisfied:

$$-2<f1/fg1<1 \qquad (5), \text{ wherein}$$

f1 designates the focal length of said positive lens element that is provided closest to the object side within said first lens group, and
fg1 designates the focal length of said first lens group.

5. The imaging optical system according to claim 1, wherein the following condition (6) is satisfied:

$$-0.20<(R1-R2)/(R1+R2)<0.55 \qquad (6), \text{ wherein}$$

R1 designates the paraxial radius of curvature of the surface on the object side of the positive lens element that is provided closest to the object side within said first lens group, and
R2 designates the paraxial radius of curvature of the surface on the image side of the positive lens element that is provided closest to the object side within said first lens group.

6. The imaging optical system according to claim 1, wherein said first lens group comprises a negative lens element provided immediately behind said positive lens element that is provided closest to the object side.

7. The imaging optical system according to claim 6, wherein said negative lens element, which is provided immediately behind said positive lens element that is provided closest to the object side, comprises a concave surface on the image side at the paraxial portion thereof.

8. The imaging optical system according to claim 6, wherein a difference in Abbe number with respect to the d-line between said positive lens element that is provided closest to the object side and said negative lens element, provided immediately behind said positive lens element that is provided closest to the object side, is 10 or greater.

9. The imaging optical system according to claim 1, wherein said second lens group comprises at least one positive lens element that has an Abbe number with respect to the d-line of 70 or greater.

10. The imaging optical system according to claim 1, wherein said second lens group comprises at least one negative lens element that has an Abbe number with respect to the d-line of 30 or less.

11. The imaging optical system according to claim 1, wherein a value of the focal length of the entire optical system divided by the maximum image height is greater than or equal to 2.9.

12. An imaging optical system comprising:
a negative first lens group, an aperture diaphragm, and a positive second lens group, in that order from the object side,
wherein said first lens group comprises a lens element provided closest to the object side,
wherein said lens element that is provided closest to the object side within said first lens group includes an aspherical surface on the object side thereof, said aspherical surface including a paraxial convex surface convexing toward the object side, wherein said aspherical surface on the object side of said lens element that is provided closest to the object side within said first lens group has a curvature that is positive along a meridional cross-section at the paraxial portion thereof, and the curvature of the meridional cross-section changes from a positive value to a negative value in an area within 75% of an effective aperture from the paraxial portion toward the periphery of the aspherical surface, and wherein a value of the focal length of the entire optical system divided by the maximum image height is greater than or equal to 2.9.

* * * * *